(12) United States Patent
Khan et al.

(10) Patent No.: US 11,593,144 B2
(45) Date of Patent: Feb. 28, 2023

(54) NEAR-HITLESS UPGRADE OR FAST BOOTUP WITH VIRTUALIZED HARDWARE

(71) Applicant: Cisco Technology, Inc., San Jose, CA (US)

(72) Inventors: Riaz Khan, Milpitas, CA (US); Atri Indiresan, Sunnyvale, CA (US); Manas Pati, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 17/029,559

(22) Filed: Sep. 23, 2020

(65) Prior Publication Data
US 2022/0091870 A1  Mar. 24, 2022

(51) Int. Cl.
G06F 9/455 (2018.01)
H04L 12/44 (2006.01)
H04L 41/12 (2022.01)
G06F 8/656 (2018.01)
G06F 9/4401 (2018.01)
H04L 67/141 (2022.01)
H04L 67/00 (2022.01)

(52) U.S. Cl.
CPC .......... G06F 9/45558 (2013.01); G06F 8/656 (2018.02); G06F 9/4403 (2013.01); G06F 9/4416 (2013.01); H04L 12/44 (2013.01); H04L 41/12 (2013.01); H04L 67/141 (2013.01); H04L 67/34 (2013.01); G06F 2009/4557 (2013.01); G06F 2009/45595 (2013.01)

(58) Field of Classification Search
CPC ....... H04L 67/34; H04L 41/12; H04L 45/586; H04L 12/44; H04L 67/141; H04L 49/70; H04L 49/557; G06F 9/4403; G06F 9/45558; G06F 8/656; G06F 9/4416; G06F 2009/4557; G06F 2009/45595
See application file for complete search history.

(56) References Cited

U.S. PATENT DOCUMENTS

| 8,804,494 | B1 | 8/2014 | Uberoy |
| 9,391,796 | B1 | 7/2016 | Shekhar et al. |
| 10,454,754 | B1 | 10/2019 | Patel et al. |
| 10,567,252 | B1 | 2/2020 | Mukhopadhyaya et al. |
| 10,771,475 | B2 | 9/2020 | Chen et al. |
| 2013/0163607 | A1 | 6/2013 | Shukla et al. |

(Continued)

OTHER PUBLICATIONS

Song, S., et al., "Control Path Management Framework for Enhancing Software-Defined Network (SDN) Reliability," IEEE Transactions on Network and Service Management, vol. 14, No. 2, 2017, pp. 302-316.

(Continued)

Primary Examiner — Frantz B Jean
(74) Attorney, Agent, or Firm — MMeunier Carlin & Curfman LLC

(57) ABSTRACT

An embodiment is directed to switchover operations with a virtualized network device in a cloud or remote infrastructure. The virtualized hardware switchover operations may be used to selectively and temporarily provide virtualized control-plane operations to the data-plane of a non-redundant network device undergoing an upgrade or a reboot of its control plane. A non-redundant network device may operate hitless, or near hitless, operation even when its control plane is unavailable.

19 Claims, 14 Drawing Sheets

(56) References Cited

U.S. PATENT DOCUMENTS

| | | |
|---|---|---|
| 2014/0269254 A1 | 9/2014 | Choorakkot Edakkunni et al. |
| 2015/0106651 A1* | 4/2015 | Sawal ................... G06F 8/656 714/19 |
| 2015/0186206 A1 | 7/2015 | Bhattacharya et al. |
| 2016/0019044 A1 | 1/2016 | Stolarchuk et al. |
| 2017/0168803 A1* | 6/2017 | Katiyar ................... G06F 8/65 |
| 2018/0063074 A1* | 3/2018 | Shankarappa ........ G06F 9/5061 |
| 2018/0352036 A1 | 12/2018 | Baid et al. |
| 2019/0020626 A1 | 1/2019 | Sethi et al. |
| 2019/0379731 A1 | 12/2019 | Johnsen et al. |
| 2020/0313999 A1 | 10/2020 | Lee et al. |
| 2021/0144517 A1* | 5/2021 | Guim Bernat ...... H04L 41/5054 |
| 2021/0200600 A1* | 7/2021 | Thakkar ................ G06F 9/5027 |
| 2022/0094645 A1 | 3/2022 | Khan et al. |

OTHER PUBLICATIONS

International Search Report and Written Opinion, dated Jan. 13, 2022, received in connection with corresponding International Patent Application No. PCT/US2021/051461.

* cited by examiner

NEAR-HITLESS UPGRADE OR FAST BOOTUP WITH VIRTUALIZED HARDWARE

TECHNICAL FIELD

Embodiments of the present invention relate to networking equipment, in particular, hardware and software architecture and components that provide a virtualized switch in switchover operations. ss

BACKGROUND

Modern networking devices such as switches are configured with a data plane (also referred to as the forwarding plane), a control plane, and a management plane.

The data or forwarding plane comprises an amalgamation of hardware and software components responsible for the routing of packets from one port of the device to another port and are optimized for speed, simplicity, and regularity. The data plane relies on routing and/or forwarding tables that are maintained in high-speed, often customized, memory or tables. In most implementations, data plane components typically include processors that interface with application-specific integrated circuits (ASICs) and high-speed memory across dedicated data buses or switch fabrics.

The control plane operates with the data plane and is primarily responsible for the populating and updating of the routing or forwarding tables, among other things. Control plane hardware components are typically optimized for customizability, handling policies and exceptions, and are often implemented via microprocessor(s) (often referred to as a host processor(s)) that implement instructions stored in local memory.

During software upgrade operation, particularly for non-redundant switches, the upgrade operation involves bringing down the control plane so the operating system or application executing in that operating space can be updated. While the data-plane can be left running, without the control plane, the routing and forwarding information in the data-plane and protocol state machine changes in the control plane can become stale or lost. Redundant equipment, which has its own independent set of data-plane and control-plane components, are often used in switchover operations to completely take over the role of the upgrading device.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF THE EXAMPLE EMBODIMENTS

Overview

Figure 1A:
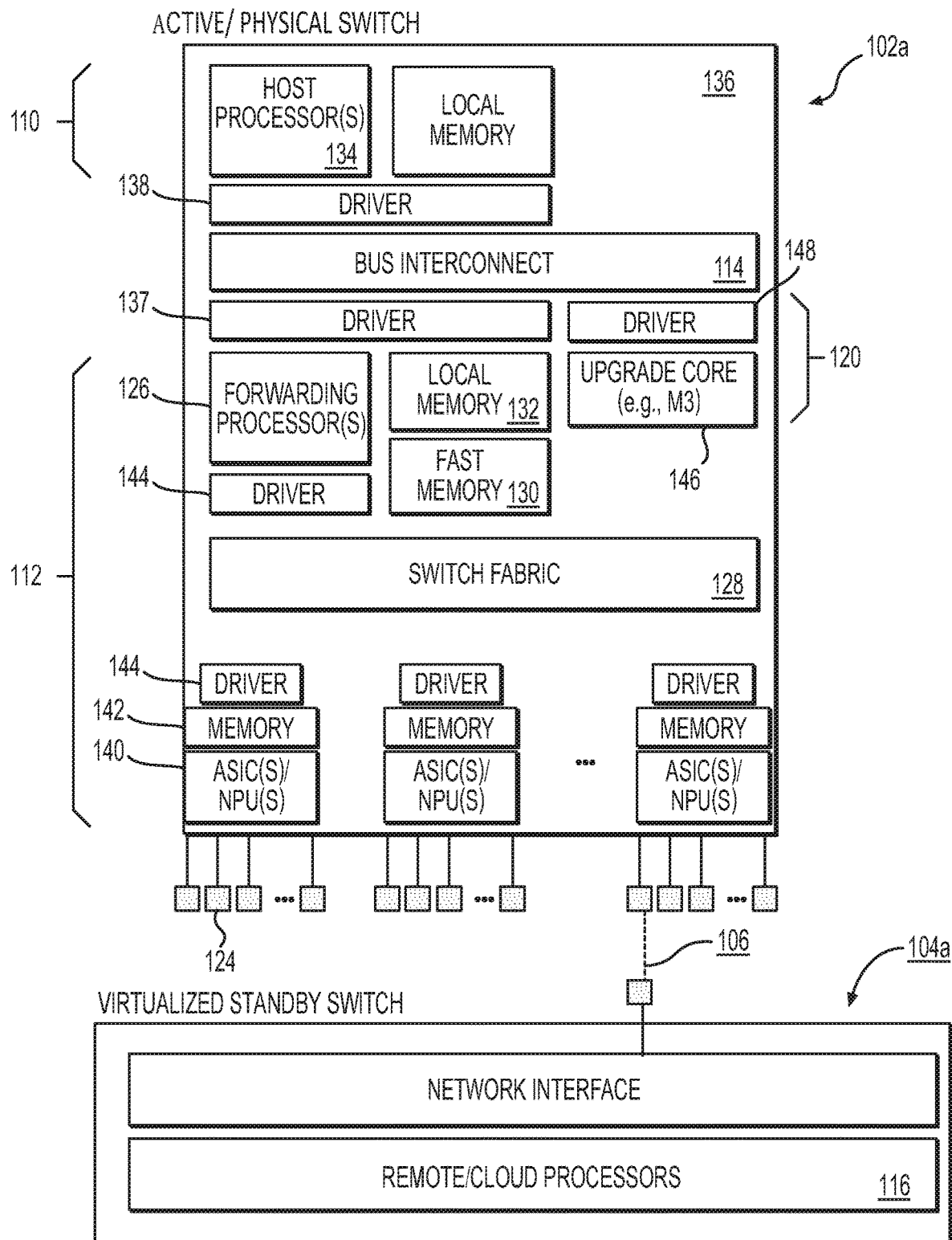
FIGS. 1A, 1B, and 1C each shows a diagram of an exemplary network device configured to operate with a virtualized standby device over a connection in accordance with an illustrative embodiment.

In an aspect, an embodiment of the present disclosure is directed to switchover operations (also referred to as virtualized hardware switchover operations) with a virtualized network device (also referred to herein as a virtualized standby switch) in a cloud or remote infrastructure. The virtualized hardware switchover operations may be used to selectively and temporarily provide virtualized control-plane operations to the data-plane of a non-redundant network device undergoing an upgrade or a reboot of its control plane. To this end, the non-redundant network device can maintain hitless, or near hitless, operation for its data plane even when its control plane is unavailable. The term "selectively" is used herein to refer to the selective use of the virtualized hardware as a proxy of the control plane of the active network device and not that of the data-plane. The term "temporarily" is used herein to refer to the limited duration that the virtualized hardware is used (e.g., for virtualized hardware switchover operations), though, in some embodiments, it is contemplated that the virtualized hardware and techniques described herein can be used in an on-going manner, say, to augment the processing power of the control plane of the active network device.

The term "control plane" is a general term that is used to refer to group of functions and packets that involve configuration, protocol state-machine, state of the switch etc. and usually implemented in the host processor of the switch. Examples of such traffic may include Spanning Tree Protocol (STP), Hot Standby Router Protocol (HSRP), and control packets that are destined to the switch, or sent from the switch or application layer protocols such as Secure Shell (SSH) and Simple Network Management Protocol (SNMP) that must be handled by the host processor.

During the virtualized hardware switchover operation, in some embodiments, a virtualized network device is dynamically created (and subsequently deleted) and synchronized in control-plane states to the non-redundant network device (also referred to herein as the "active network device" or "active switch" in switchover lexicon). The states between the virtualized hardware and the physical hardware may be synchronized using synchronization operation used in high availability (HA) operations, such as In-Service Software Upgrade (ISSU) operations and/or Stateful Switchover (SSO) operations. A virtual transport layer (e.g., implemented by a control-plane data-plane interface transport module, also referred to herein as a "virtual PCI" or "VPCI module") may be executed in each of the active network device and in the virtualized network device, at the respective edge of the data-plane and control-plane, to transport bus transactions, e.g., associated with control-plane updates, from the data plane of the active network device to the control plane of the virtualized network device over a network tunnel, and vice versa. Stated differently, virtual transport layer can be characterized as a data-plane access interface or virtual DP access interface. In addition, rather than PCI, other access interface may be used as discussed herein, include AXI interface, and etc. That is, the control-plane data-plane interface transport module also transports bus transactions, e.g., associated with data-plane updates, from the control plane of the virtualized network device and the data plane of the active network device over a network tunnel to update the data-plane.

In addition to fast upgrade and fast reboot operation, the virtualized switchover operation and virtual transport operation can be used, singularly or in combination, for a non-redundant network device (and redundant network devices), to improve high availability (HA) operations, such as In-Service Software Upgrade (ISSU) operations, and/or Stateful Switchover (SSO) operations, that typically requires redundant hardware while providing an access interface to the data plane.

In some embodiments, the virtualized network device is instantiated in cloud or remote infrastructure (e.g., cloud servers or private servers). In other embodiments, rather than cloud or remote infrastructure, the virtualized hardware switchover operation is executed with a local computing device, e.g., mobile or portable devices, e.g., laptop, iPad, and the like. In each of these embodiments, indeed, the virtualized network device does not require its own data-plane components, and only need to have the computing capability to manage the control-plane of the active network device. In some embodiments, the virtualized network device may be implemented across multiple cores or processing unit, e.g., using hyperthreading capabilities.

Notably, the virtualized network device is configured with the same computer readable instructions associated with the system image (e.g., comprising the operating system and routing application) as that of the active network device. To this end, the transactions received at the bus interconnect to update data plane tables and associated states can be performed by virtualized network device using the same system image. This modularity ensures that virtualized hardware switchover operation can be performed for any system image as generated through current development processes and workflow without need for customization or modification of the system image for it be used for this purpose. In some embodiments, the software image and control-plane can be run on top of a virtual machine (VM) or virtual host, e.g., based on virtualization or containerization technology, which are used interchangeably herein.

In maintaining hitless, or near hit-less control-plane, for non-redundant network devices (e.g., non-redundant switches), security enhancements and bug fixes and other updates can be applied to non-redundant network devices, e.g., that are in critical infrastructure, such as for real-time controls in factory automation, without need for local redundant hardware. In some instances, reducing disruption time during minor upgrades to a few seconds can be the difference between having an uptime or a downtime for the factory automation application, particularly, where factory automation application have failsafe timeout operations to ensure proper synchronization of its real-time agents. Having these minor upgrades (as well as major ones) performed at higher frequency would thus improve the overall system health and security of the underlying network and the overall platform.

In an aspect, a network device (e.g., non-redundant stackable or non-stackable switch) comprising a host processor executing instructions for control-plane operations that manage and maintain a plurality of data-plane-associated tables of a switch-fabric of the network device; a network interface (native or plug-able); a memory having computer readable instructions, wherein execution of the computer readable instruction, causes the host processor to establish, via the network interface, a network connection (e.g., a tunnel or an inter-chassis link) with a remote computing device comprising a remote processor; direct the remote computing device to instantiate a virtualized standby switch (e.g., on a virtual machine or a container), wherein the instantiated virtualized standby switch is configured to execute a set of instructions, to manage and maintain the plurality of data-plane-associated tables of the switch-fabric of the network device; synchronize control-plane states of the virtualized standby switch with control-plane states of the network device; and reset the host processor to boot-up with a new system image in an upgrade or boot-up process, wherein during the upgrade process, the virtualized standby switch is configured to update, via data-plane transaction messages over the network interface, one or more of the plurality of data-plane-associated tables (e.g., L2 MAC table, MAC learning tables, L3 tables, FIB, etc.), and states of the network device. In some embodiments, the set of instructions for the control plane operation is the same as that of the network device (e.g., same version). In other embodiments, the set of instructions for the control operation is different, but functionally the same or compatible, from that of the network device (e.g., different version). That is, the image that runs on physical hardware and the virtual switch are derived, in some embodiments, from the same code base, but the image is different. Also, in case of image upgrade/downgrade, it will be a different version of the code, and could have substantial differences.

The term "host processor", as used herein, is used interchangeably with the term "host CPU" and generally refers to cores of a microprocessor or microcontroller, e.g., having RISC or CISC architecture, of a device of interest, e.g., of an active network device (e.g., switch), that are configured to execute computer instructions within the framework of an operating system in a networking device.

The term "remote processor", as used herein, is used interchangeably with the term "remote CPU" and generally also refers to cores of a microprocessor or microcontroller, e.g., having RISC or CISC architecture, of a remote or cloud server or network device, that are configured to execute computer instructions within a virtualization or container framework of the remote or cloud server. The remote processor is configured to execute, e.g., via a virtualized hardware switchover operation, the control plane of the active network device to serve as a proxy control plane for the active network device when it is unavailable.

The term "stackable switch" refers to a network switch that is fully functional when operating as a standalone device, but which can also be set up to cooperatively operate together with one or more other network switches as a group in which the group can be configured to show the characteristics of a single switch. Indeed, the stack may have a common set of one or more IP addresses for remote administration of the stack as a whole. Stackable switches, and similar class device, can provide redundant operations to individual switches in switchover operations. Non-stackable switches also refer to switches configured to operate as a standalone device. Stackable and non-stackable switches may be configured with modules to perform virtualized hardware switchover operations as described herein.

The term "switchover" generally refers to the manual or automatically triggered) switching of operation from one network device to a redundant or standby network device (e.g., for failure of a control-plane process but is used in the instant embodiments to perform system maintenance, such as installing patches, and upgrading software. Virtualized hardware switchover operation as described herein, in contrast, refers to the switching of control-plane operations from the active network device to a virtualized network device where the data plane operation continues to operate at the active network device. Virtualized hardware switchover operation, preferably, relies on conventional and/or existing switchover mechanisms and programs to perform the various hand-shaking operations and the synchronization of control-plane states. These switchover mechanisms are coupled with other operations described herein to perform the virtualized hardware switchover operation, including virtualization mechanisms, cloud infrastructure, and/or bus interconnect transport mechanisms, among others.

The term "data-plane" generally encompasses data-plane processor(s) and data-plane resource(s) configured to route packets from one port of a network device to another port. Data-plane processor (also referred to herein as data-plane devices) can include processing units involved in the switching and/or routing of packets in the network device such as network processors (NPUs), switching-ASICs (application-specific integrated circuit), switching FPGA (field-programmable gate array), CPLD (complex programmable logic device), and the like. Examples of data-plane resources may include, but are not limited to, MAC address table(s), FIB table(s), ACL table(s), and any other tables, register contents, content address memory (CAM) contents, tertiary content address memory (TCAM) contents, binary content-addressable memory (BCAM) contents, and memory contents (e.g., non-persistent, volatile, etc.) maintained or used by data-plane processors.

In some embodiments, the network device includes a second processor unit or upgrade logic circuit (i.e., a non-host CPU component, e.g., logic circuits of NPU, RP, ASIC, switching-FPGA, or a core located therein or an auxiliary processor) (e.g., implementing a PCI transport module, also referred to herein as a VPCI module) configured to: write a first set of bus-interconnect transactions to a bus-interconnect of the network device based on a first set of data-plane transaction messages received from the virtualized standby switch over the network interface, wherein the first set of bus-interconnect transactions updates a portion of the plurality of data-plane-associated tables of the network device (e.g., configure newly learnt MAC entries, update LACP EtherChannel membership); and read a second set of bus-interconnect transactions from the bus interconnect and transmit the second set of bus-interconnect transactions as a second set of data-plane transaction messages to the virtualized standby switch over the network interface, wherein the virtualized standby switch is configured to write a second set of bus-interconnect transactions to the bus interconnect or a host processor, as a logical equivalent of the bus interconnect, of the virtualized standby switch based on the second set of data-plane transaction messages to update control plane states maintained by the virtualized standby switch.

In some embodiments, the computer readable instruction, when executed by the host processor, cause the host processor to establish a tunnel connection (e.g., IP tunnel, GRE tunnel, IPSec tunnel, VXLAN tunnel, etc.) with the virtualized standby switch.

In some embodiments, the computer readable instructions to synchronize the control-plane states of the virtualized standby switch with the control-plane states of the network device comprises instructions for switchover operations with a physical switch.

In some embodiments, the control-plane associated message comprises protocol state machine updates.

In some embodiments, the network device comprises a non-redundant stackable switch.

In some embodiments, the network interface and the second processor unit or upgrade logic circuit is a part of a plug-able module that is connected to a bus-interconnect of the network device.

In some embodiments, the virtualized standby switch provides near-hitless operation of the network switch while the host processor is unavailable during the upgrade or boot-up process.

In some embodiments, the synchronization operation is performed using at least In-Service Software Upgrade (ISSU) operations and Stateful Switchover (SSO) operations, or other high availability (HA) operations.

In some embodiments, the virtualized standby switch is configured to synchronize with the control-plane states of the network device over a finite period (e.g., in a few minutes).

In some embodiments, the network device directs the remote computing device to instantiate the virtualized standby switch by directing the remote computing device to retrieve a system image of the network device from an image server.

In some embodiments, the update of the one or more of the plurality of data-plane-associated tables and states of the network device includes: updates associated with newly learnt MAC entries; updates associated with Layer 3 entries (e.g., IPv4 or IPv6); updates associated with EtherChannel membership; updates associated with Spanning Tree Protocol topology-change; updates associated with protocol state or resource state change; and/or updates associated with hardware resource transition change.

In some embodiments, the network connection between the active switch and the standby (virtual) switch comprises a front-side inter-chassis system link (e.g., Stackwise Virtual Link (SVL) or the like) of the switch.

In some embodiments, the network connection comprises a back-side inter-chassis system link of the switch that connects to a communication link across an adapter.

In some embodiments, the computer readable instructions includes instructions to synchronize the control-plane states of the network device with the control-plane states of the virtualized standby switch after the host processor boot-ups with the new system image.

In another aspect, a method is disclosed to upgrade a non-redundant stackable switch comprising a host processor executing a system image, the method comprising establishing, via a network interface of the stackable switch, a network connection (e.g., a tunnel) with a remote computing device comprising a remote processor; directing the remote computing device to instantiate a virtualized standby switch (e.g., on a virtual machine or a container), wherein the instantiated virtualized standby switch is configured to execute a set of instructions to manage and maintain the plurality of data-plane-associated tables of the switch-fabric of the network device; synchronizing, over a switchover operation, control-plane states of the virtualized standby switch with control-plane states of the network device; and resetting the host processor to boot-up with a new system image in an upgrade or boot-up process, wherein during the upgrade process, the virtualized standby switch is configured to update, via data-plane transaction messages over the network interface, one or more of the plurality of data-plane-associated tables (e.g., L2 MAC table; MAC learning tables; L3 tables; FIB, etc.), and states of the network device.

In some embodiments, the method includes receiving, over the network interface, a first set of data-plane transaction messages from the virtualized standby switch; writing (e.g., via a vPCI module) a first set of bus-interconnect transactions to a bus-interconnect of the stackable switch based on the received first set of data-plane transaction messages, wherein the first set of bus-interconnect transactions updates a portion of the plurality of data-plane-associated tables of the network device; reading (e.g., via the vPCI module), from the bus interconnect, a second set of bus-interconnect transactions from the data-plane of the stackable switch; and transmitting, to the virtualized standby switch, over the network interface, a second set of data-plane transaction messages generated based on the second set of bus-interconnect transactions, wherein the virtualized standby switch is configured to write a second set of bus-interconnect transactions to the bus interconnect of the virtualized standby switch based on the second set of data-plane transaction messages to update control plane states maintained by the virtualized standby switch.

In some embodiments, the update of the one or more of the plurality of data-plane-associated tables and states of the network device includes: updates associated with newly learnt MAC entries; updates associated with Layer 3 entries (e.g., IPv4 or IPv6); updates associated with EtherChannel membership; updates associated with Spanning Tree Protocol topology-change; updates associated with protocol state or resource state change; and/or updates associated with hardware resource transition change, and wherein the virtualized standby switch is configured to provide near-hitless operation of the network switch while the host processor is unavailable during the upgrade or boot-up process.

In another aspect, a non-transitory computer readable medium is disclosed comprising computer readable instructions, wherein execution of the computer readable instruction by a processor of a network device, cause the processor to establish, via a network interface of the network device, a network connection (e.g., a tunnel) with a remote computing device comprising a remote processor; direct the remote computing device to instantiate a virtualized standby switch (e.g., on a virtual machine or a container), wherein the instantiated virtualized standby switch is configured to execute a set of instructions to manage and maintain the plurality of data-plane-associated tables of the switch-fabric of the network device; synchronize control-plane states of the virtualized standby switch with control-plane states of the network device; and reset the host processor to boot-up with a new system image in an upgrade or boot-up process, wherein during the upgrade process, the virtualized standby switch is configured to update, via data-plane transaction messages over the network interface, one or more of the plurality of data-plane-associated tables (e.g., L2 MAC table; MAC learning tables; L3 tables; FIB, etc.), and states of the network device.

In some embodiments, the computer readable instructions, when executed by the processor, further cause the processor to: receive, over the network interface, a first set of data-plane transaction messages from the virtualized standby switch; write (e.g., via a vPCI module) a first set of bus-interconnect transactions to a bus-interconnect of the active switch based on the received first set of data-plane transaction messages, wherein the first set of bus-interconnect transactions updates a portion of the plurality of data-plane-associated tables of the network device; read, from the bus interconnect, (e.g., via the vPCI module) a second set of bus-interconnect transactions from the data plane; and transmit, to the virtualized standby switch, over the network interface, a second set of data-plane transaction messages generated based on the second set of bus-interconnect transactions, wherein the virtualized standby switch is configured to write a second set of bus-interconnect transactions to the bus interconnect of the virtualized standby switch based on the second set of data-plane transaction messages to update control plane states maintained by the virtualized standby switch.

Example System

FIGS. 1A, 1B, 1C, and 2 each shows a diagram of an exemplary network device 102 (shown as active/physical switch 102a, 102b, 102c, and 102, respectively) configured to operate with a virtualized standby device 104 (shown as a "virtualized standby switch" 104a, 104b, 104c, and 104, respectively) over a connection 106 in accordance with an illustrative embodiment. The connection 106, in some embodiments, is a network tunnel established over a network 108 (shown in FIG. 2) between the network device (e.g., 102) and the virtualized standby device (e.g., 104). In some embodiments, the virtualized standby device is executed in a cloud infrastructure. In other embodiments, the connection 106 is a direct communication link, e.g., direct serial communication link such as ethernet cross-over cable, ethernet, USB, FireWire, SVL link, Sonet/SDH, Frame-relay, X.25, T1/E1, and the like, that can sufficiently provide control plane and data plane updates. Direct communication link can also refer to wireless links such as WiFi (e.g., 802.11), LTE 4G/5G, WiMAX, and the like.

As discussed above, a stackable switch can be a network switch that is fully functional when operating as a standalone device, but which can also be set up to cooperatively operate together with one or more other network switches as a group. Stackable switches, and similar class device, can provide redundant operations to individual switches in switchover operations. Non-stackable switches also refer to switches configured to operate as a standalone device. Stackable and non-stackable switches may be configured with modules to perform virtualized hardware switchover operations as described herein.

In FIG. 1A, the active network device 102a is shown comprising a plurality of ports 124 coupled to forwarding engine, which is coupled to a forwarding processor 126 via a bus structure 128 (shown as "switch fabric" 128). Forwarding processor(s) 126 can be used to execute routing protocols, e.g., by maintaining routing information and forwarding table(s). The forwarding processor 126 may have access to fast memory 130 (such as ternary content-addressable memory (TCAM), CAM, SRAM, buffers, etc.) and local memory 132 (e.g., dynamic random-access memory (DRAM), SRAM)).

The forwarding processor 126 may communicate with a host processor 134 (also referred to herein as a host CPU and shown as "Host Processor(s)" 134). As discussed above, a host CPU (134) generally refers to a core of a microprocessor or microcontroller, e.g., having RISC or CISC architecture, that is configured to execute general computer instructions (i.e., applications, middleware) within the framework of an operating system. Here, computer instructions generally refer to general instructions, preferably, that are prepared not to be specifically tied to a particular computer architecture. The host CPU 134 interfaces with the bus interconnect 114 (e.g., PCI or PCIe (PCI-express) bus) that serves as a data plane interface to the forwarding processors 126 and/or other components of the data-plane 112. PCIe can refer to PCI-X, PCI-express 16x, PCI-express 1x, and the like. In some embodiments, the host CPU 134 and forwarding processor 126 are co-located on a same printed-circuit or circuit assembly 136. In yet other embodiments, the host processor 134 is used as a substitute for, or integrated with, the forwarding processor 126 or components thereof, e.g., in a network-on-a-chip (NoC). The bus interconnect 114 provides connectivity between the host CPU 134 and the data plane 112, which access the bus interconnect 114 through bus drivers 137.

In FIG. 1A, the forwarding processor 126 is shown to connect through the switch fabric 128 to a plurality of forwarding engines comprising one or more ASIC(s) 140, memory and memory-like resources 142 (e.g., CAM, registers, buffers), and driver 144. The forwarding engine is configured to route a frame received at one of its port to another port or to route the frame to the switch fabric 128 to other ports in the network switch. Other configurations and implementations may be implemented. An "ASIC" as used herein may refer to a customized application specific integrated circuit as well as configurable integrated circuit such as field-programmable gate array (FPGA) and complex programmable logic device (CPLD).

Broadly stated, when a frame (also referred to as a packet) is received at a port 124 at the forwarding engine, the frame is driven over an internal bus of the engine based on forwarding decision rendered by the ASIC 140 (or local processor) or is driven over the switch fabric 128 to other ports based on forwarding decision rendered by the forwarding engine. Such frames are processed by the data plane (also referred to as the forwarding plane, among other) of the network device (e.g., 102). In FIG. 1A, the data-plane 112 is shown as any component and associated resources involved in the forwarding and routing of user traffic. The data-plane (e.g., forwarding engine) renders the forwarding decision by accessing a forwarding or routing table to look-up a destination MAC address of the frame. Frames associate with the control plane (e.g., those associated layer-2 and/or layer-3 control protocol such as Spanning Tree Protocol (STP), Open Shortest Path First (OSPF), Multiprotocol Label Switching (MPLS), Internet Group Management Protocol (IGMP), Intermediate System to Intermediate System (IS-IS), Border Gateway Protocol (BGP), PIM, Enhanced Interior Gateway Routing Protocol (EIGRP), Routing Information Protocol (RIP), Virtual LAN (VLAN), Virtual Extensible LAN (VxLAN), etc.) and management plane (e.g., associated with telnet, command line interface (CLI), file transfer protocol (FTP), trivial file transfer protocol (TFTP), syslog, secure shell (SSH), simple network management protocol (SNMP), Hypertext Transfer Protocol (HTTP), HTTP Secure (HTTPS), access control lists (ACL), etc.) may also be received at the ports but are generally routed to the host processor 134 to update control and management operation of the active switch (e.g., 102).

As noted, control plane updates are forwarded to and processed by the host CPU 134. These can include, but are not limited to, updates associated with newly learnt MAC entries, updates associated with Layer 3 entries (e.g., IPv4 or IPv6), updates associated with EtherChannel membership, updates associated with Spanning Tree Protocol topology-change, updates associated with protocol state or resource state change; and/or updates associated with hardware resource transition change. In such embodiments, when a control plane associated packet is received, it is directed through the forwarding engine and data plane components 112 to the bus interconnect 114 to the host CPU 134. The host CPU 134 then determines any updates to the data-plane-associated tables of the data plane 112 and write that updates to the bus interconnect 114, which are updated by the data plane 112.

The network device (e.g., 102), as a redundant or non-redundant system, may include additional cards comprising processors and memory to perform other control or supervisory operations of the network device. In some embodiments, the additional cards may be implemented in general-purpose or special purpose computing devices environments, virtual network environment, or configurations. Components on the additional cards may be connected to other components via the bus interconnect 114 or the switched fabric 128. The bus interconnect 114 also may allow the host CPU 134 to connect to the data-plane 112 via a host CPU driver 138.

Computer-executable instructions, such as program modules, being executed by a computing device (e.g., via the host CPU) may be used. Generally, program modules include routines, programs, objects, components, data structures, etc. that perform particular tasks or implement particular abstract data types. Computer-executable instructions may execute the Protocol and/or Resource State Transition Tracker functionality to be discussed below.

Distributed computing environments may be used where tasks are performed by remote processing devices that are linked through a communications network or other data transmission medium. In a distributed computing environment, program modules and other data may be located in both local and remote computer storage media including memory storage devices.

Computing device typically includes a variety of computer readable media. Computer readable media can be any available media that can be accessed by the device and includes both volatile and non-volatile media, removable and non-removable media. Computer readable media may be used to store executable instructions for the virtualized hardware switchover operations. Computer storage media include volatile and non-volatile, and removable and non-removable media implemented in any method or technology for storage of information such as computer readable instructions, data structures, program modules or other data. Memory, removable storage, and non-removable storage are all examples of computer storage media. Computer storage media include, but are not limited to, RAM, ROM, electrically erasable program read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by computing device. Any such computer storage media may be part of computing device. Computer-executable instructions and computer storage media are well known in the art and are not discussed at length here.

Computing device may contain communication connection(s) that allow the device to communicate with other devices. Computing device may also have input device(s) such as a keyboard, mouse, pen, voice input device, touch input device, etc. Output device(s) such as a display, speakers, printer, etc. may also be included. All these devices are well known in the art and are not discussed at length here.

Because of the limited redundancy of supporting data-plane components, implementations of the protocol state transition and/or resource state transition tracking module in such systems can be particularly beneficial to overall system uptime.

Example Virtualized Network Device

As discussed above, FIGS. 1A, 1B, 1C, 2, and 4, each shows the network device (e.g., 102) configured with a control plane 110 and a data plane 112 that are connected over a bus interconnect 114 (e.g., PCI or PCIe (PCI-express) bus). PCIe can refer to AXI, SPI (system packet interface), PCI-X, PCI-express 16x, PCI-express 1x, PCIe 4.0, PCIe 5.0, PCIe 6.0, and the like.

The virtualized standby switch (e.g., 104) as a remote or cloud server (or as portable or mobile devices) has a corresponding set of control plane 116 (shown as a "Remote/Cloud Processors" 116) and bus interconnect 118 (see FIG. 2), or a logical equivalent thereof, but no corresponding data plane. That is, the hardware and software of the virtualized standby switch 104 can execute the same or compatible operating system and applications as that of the network device (e.g., 102) and thus mimic the control plane operations of the network device. But, the virtualized standby switch (e.g., 104) does not necessarily have the corresponding hardware to execute a corresponding data plane.

Control-Plane Data-plane Interface Transport Module

In each of FIGS. 1A, 1B, 1C, 2, and 4, the network device (e.g. 102) and the virtualized network device (e.g., 104) each includes a control-plane-data-plane interface transport module 120 (shown as "VPCI" 120, 122, respectively in FIG. 2, and also referred to herein as a "virtual PCI" module or "virtual AXI" 120, 122) that serves as a virtual data-plane driver interface, or a logical equivalent thereof. The control-plane-data-plane interface transport module (e.g., 120, 122) is configured to transport bus transactions between the active network device (e.g., 102) and the virtualized network device (e.g., 104).

Control-plane updates. The control-plane data-plane interface transport module (e.g., 120) of an active network device (e.g., 102) is configured, in some embodiments, to implement read and write transaction. That is, it can read bus transactions from the data plane 112 of an active network device (e.g., 102) (intended for its control-plane 110) and provide the read transaction to the network interface, which transmits that transaction as a message over the network 108 to the virtualized network device (e.g., 104). The virtualized network device (e.g., 104) receives the messages and write, via a corresponding control-plane-data-plane interface transport module 122, bus transactions to a physical bus interconnect (e.g., FIG. 2), or a logical equivalent of (not shown), of the virtualized network device to write that control plane 110.

Figure 1B:
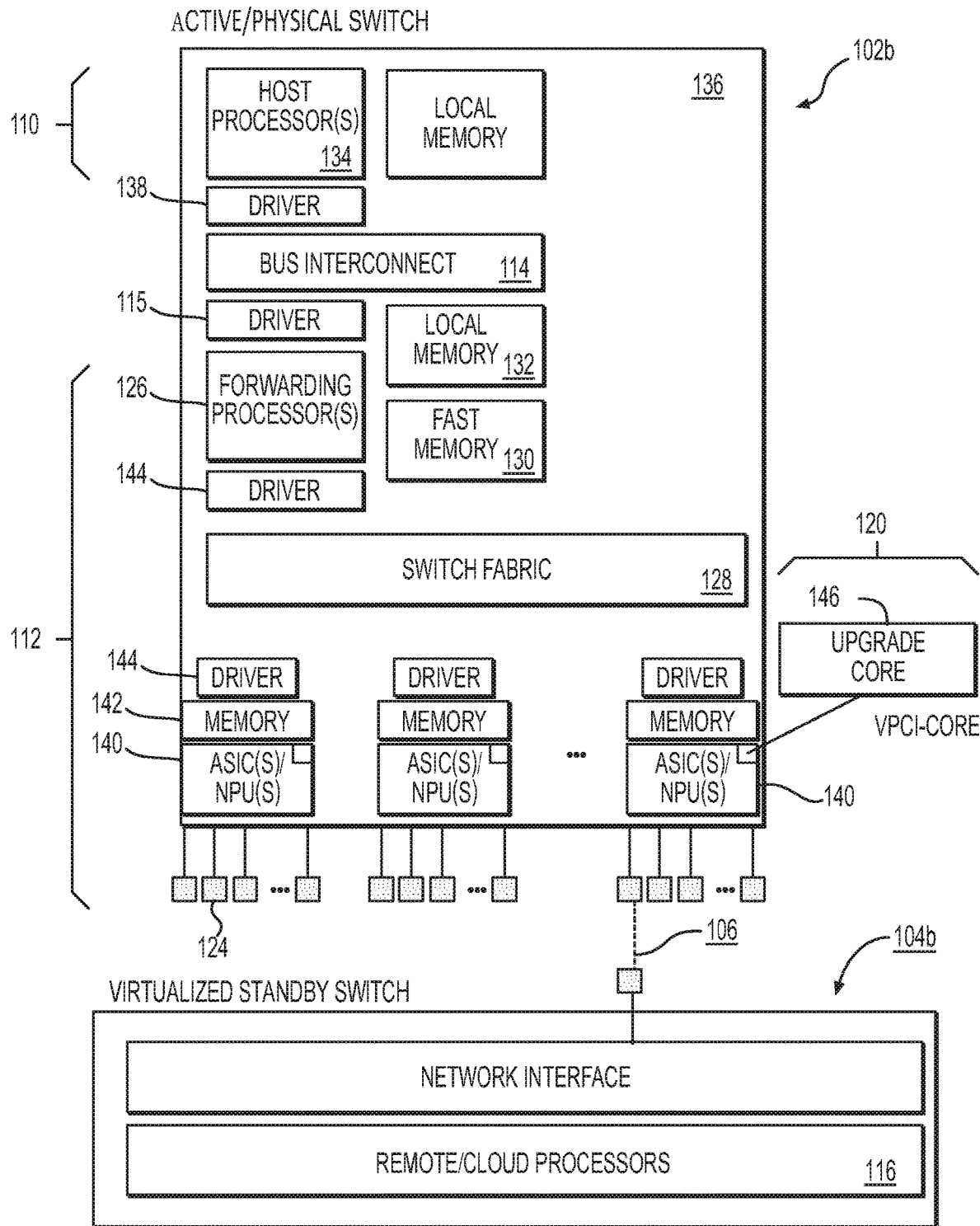
Figure 1C:
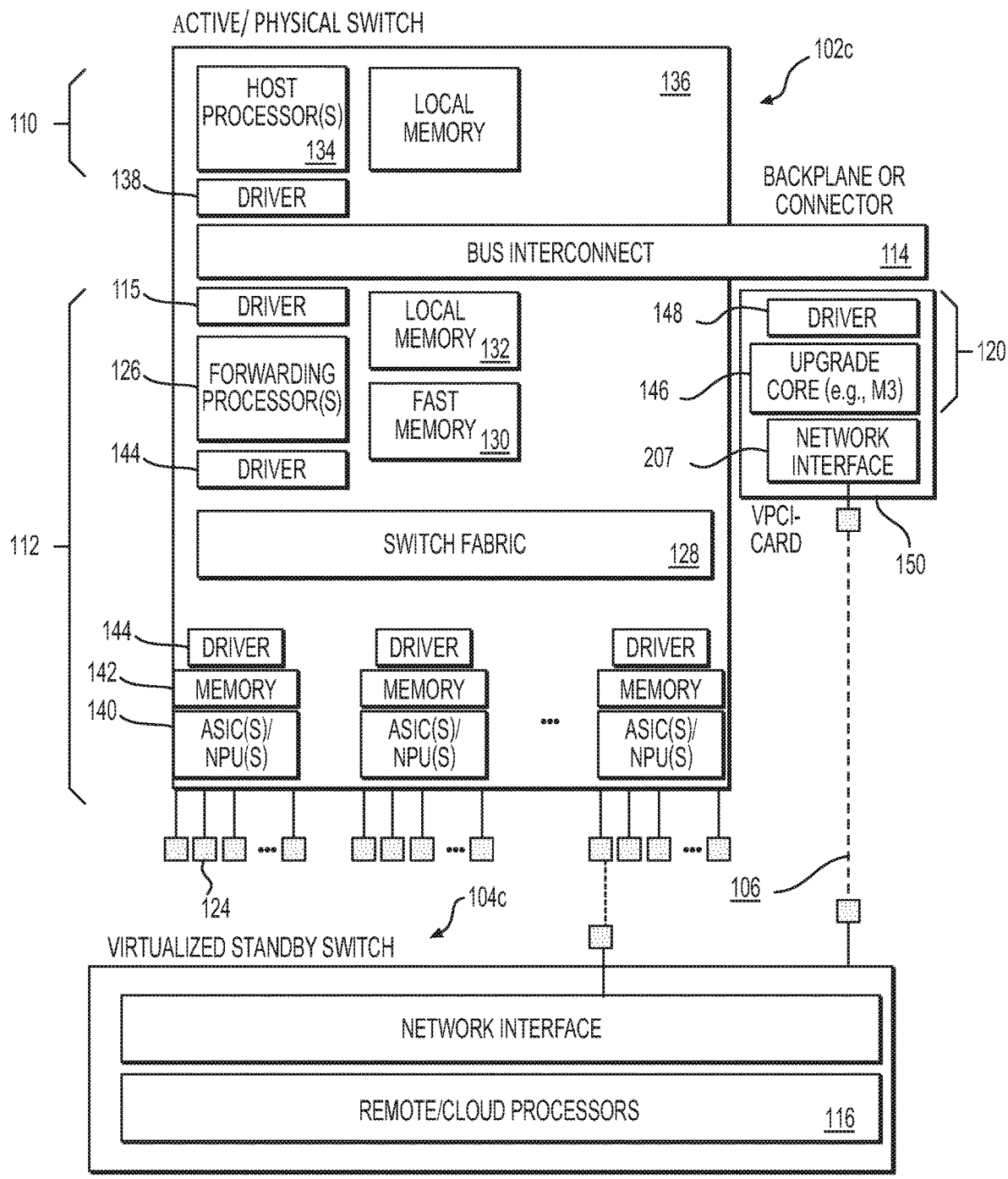

In FIG. 1A, the control-plane-data-plane interface transport module 120 is implemented as an integrated component of the active network device 102a. In FIG. 1B, the control-plane-data-plane interface transport module 120 is implemented as a core or logic circuit 146 in an ASIC 140. In FIG. 1C, the control-plane-data-plane interface transport module 120 is implemented in a core or logic circuit of an auxiliary card 150.

Figure 2:
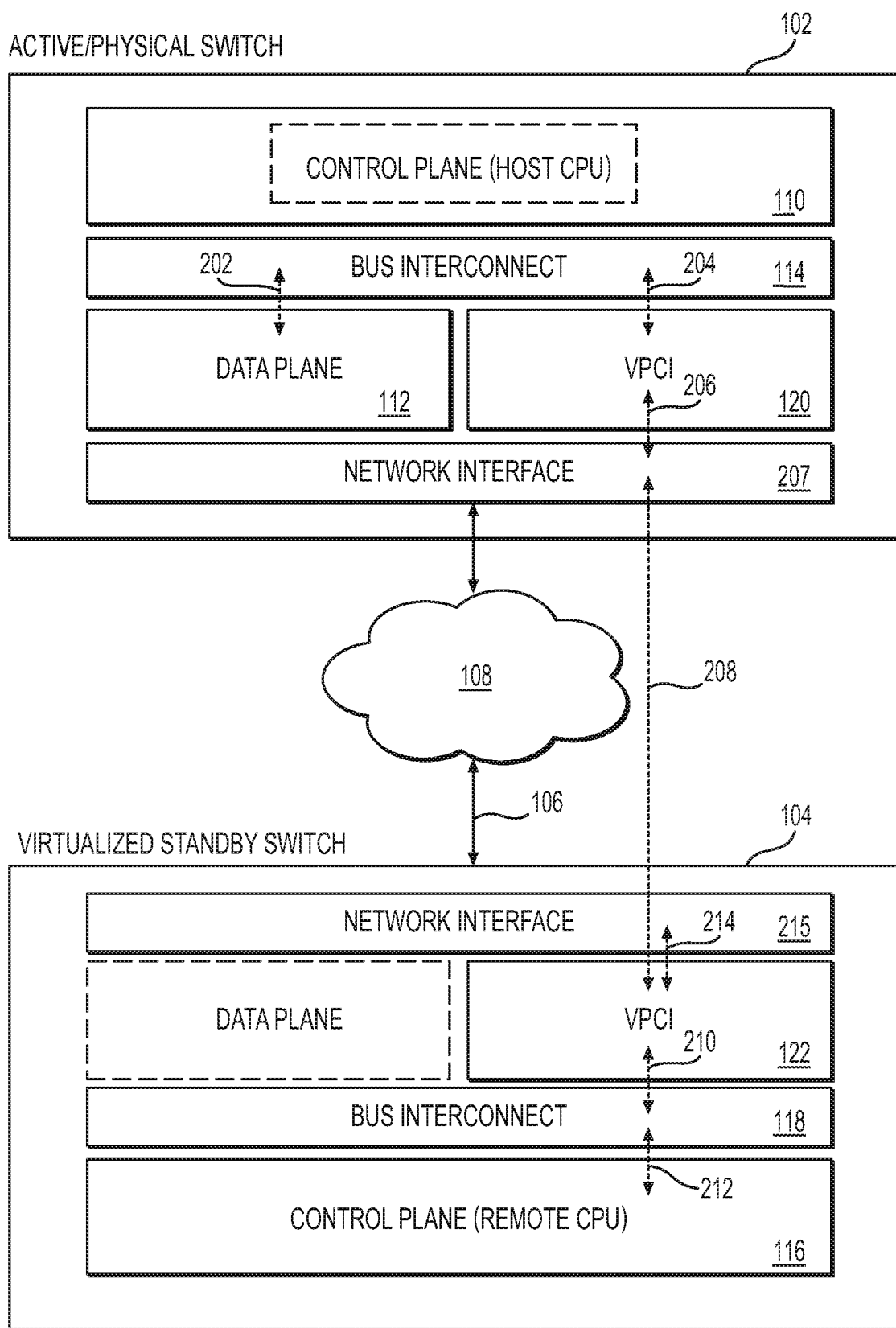
FIG. 2 shows a diagram of a method of performing a virtualized hardware switchover operation in accordance with an illustrative embodiment.

For simplicity and in relation to FIG. 2, the control-plane data-plane interface transport module (shown as "VPCI" 120) is shown to read (204), from the bus interconnect 114, bus transactions written (202) by the data plane 112 of an active network device 102 and directs (206) that read bus transaction as a message to a network interface 207 to transmit (208) the message over the network 108 to a corresponding control-plane data-plane interface transport module 122, or a logical equivalent thereof, executing at the virtualized network device 104.

In some embodiments, the control-plane data-plane interface transport module 122 of the virtualized network device 104 then receives (208) the message (e.g., encapsulated packet) from the network interface 215, unpackages the message, and writes (210) a corresponding bus transaction to the bus interconnect 118 to be read (212) by the control plane 116 of the virtualized network device 104. To this end, control plane updates received by the data plane 112 of the active network device (e.g., 102) are transported to the control-plane 116 executing on the virtualized network device 104 without any modification to the data-plane 112 nor without the data-plane knowing that the control-plane 110 of the active network device 102 is unavailable.

In other embodiments, the control-plane data-plane interface transport module 122 is implemented as a logical equivalent (not shown) of the physical module, for example, as a software module executing in the remote processor 116 in the virtualized network device (e.g., 104).

The message, in some embodiments, includes a tunnel header, packet header, and packet payload (e.g., as shown in FIG. 7). In some embodiments, the message is a transmitted using existing stack-over operations which may encapsulate the packet header and packet payload with an SVL header to which the resulting packet is encapsulated a tunnel header associated with the connection 106.

The messages can nevertheless be in any format or protocol. In some embodiments, the bus transaction is encapsulated as a payload in an encapsulated packet, which serves as the message. In some embodiments, multiple bus transactions may be encapsulated as the payload in single encapsulated packet.

In addition, although the network interface 207 is shown in FIG. 2 to be natively integrated into the active network device 102, it should be appreciated that the network device 207 could be implemented as a modular component that is plug-able into the active network device 102.

Data-plane updates. Similarly, the control-plane data-plane interface transport module 122 of the virtualized network device 104 is configured to read bus transactions, or equivalents thereof, from the control plane 116 of the virtualized network device (e.g., 104). The read bus transaction, or its equivalent, is provided to the network interface 215 and is transmitted as a message over the network 108 to the active network device (e.g., 102), which reads the message. The control-plane data-plane interface transport module 120 of the active network device (e.g., 102) uses the message to write bus transactions to the bus interconnect of the active network device (e.g., 102) to write to the data plane 112.

In FIG. 2, the control-plane data-plane interface transport module 122 of the virtualized network device (e.g., 104) is configured to read (210), from the bus interconnect 118, bus transactions written (212) by the control plane 116 of the virtualized network device (e.g., 104) and directs (214) that read bus transaction as a message to a network interface 215 to transmit (208) over the network 108 to the control-plane data-plane interface transport module 120 of the active network device (e.g., 102). The control-plane data-plane interface transport module 120 then writes (204) a corresponding bus transaction to the bus interconnect 114 to be read (212) by the data plane 112 of the active network device (e.g., 102). Data plane updates determined by the control plane (e.g., 116) of the virtualized standby device (e.g., 104) are transported to the data-plane (e.g., 112) of the active network device (e.g., 102) without any modification to the control-plane (e.g., 116) nor without the control plane (e.g., 116) knowing that it is a proxy/back-up control plane 110 of the active network device (e.g., 102).

Again, the messages can be in any format or protocol. In some embodiments, the bus transaction is encapsulated as a payload in an encapsulated packet, which serves as the message. In some embodiments, multiple bus transactions may be encapsulated as the payload in single encapsulated packet.

FIGS. 1A, 1B, 1C each shows example implementations of the control-plane-data-plane interface transport module 120 as implemented in the network device (e.g., 102).

Example Control-Plane Data-plane Interface Transport Module #1. FIG. 1A shows an example implementation of a control-plane-data-plane interface transport module 120 implemented as an integrated component of the active network device 102a in accordance with an illustrative embodiment.

In FIG. 1A, the active switch 102a includes the control-plane-data-plane interface transport module 120, which comprises an upgrade core or upgrade processor 146 (shown as "Upgrade Core (e.g., M3)" 146) and bus interconnect driver 148. The processor 146 can be implemented in a microprocessor, FPGA, ASIC/DSP, or other like instruction processing device. The upgrade core or processor 146 comprises core of a microprocessor or microcontroller, e.g., having RISC or CISC architecture, that is configured to execute general computer instructions (i.e., applications, middleware) as well as low-level computer instructions (e.g., microcode, Assembly instructions) within the framework of an operating system. The upgrade core or processor 146 may be a lightweight processor suitably sized to perform encapsulation and decapsulation operations or packet. In some embodiments, the upgrade core or processor 146 may be executed in a core of a forwarding processor 126, which may interface with the bus interconnect 114 through the driver 137. Other than Cortex M3, ARM A7/A15/A53 may also be used here. When used as a helper to Host-CPU, these are generally termed as "services processor."

Example System #2—ASIC Core VPCI/VAXI. FIG. 1B shows an example implementation of a control-plane-data-plane interface transport module 120 as a virtual data-plane driver interface implemented as a core or logic circuit 146 (shown as "Upgrade Core" 146) in the ASIC 140 in accordance with an illustrative embodiment. In some embodiments, the ASIC 140 includes an IP core comprising a CPU or DSP unit, peripheral interfaces, standard interfaces, integrated memories, and/or reconfigurable, uncommitted logic. The ASIC 140 may include a driver to directly write and read to the bus interconnect 114 or indirectly through the switch fabric.

Example System #3—Auxiliary Card VPCI/VAXI. FIG. 1C shows an example implementation of a control-plane-data-plane interface transport module 120 as a virtualized data-plane driver interface implemented as a core or logic circuit in an auxiliary card 150 in accordance with an illustrative embodiment. The auxiliary card 150 may include a printed-circuit or circuit assembly configured to interface with the bus interconnect 114 (as shown) or the switch fabric (not shown). The auxiliary card 150, e.g., a logical data plane interface card, may include a core or logic circuit 146, a driver 115, and the network interface 207.

Example Orchestration of Virtualized Standby Switch Using Stateful Switch-Over

Figure 3A:
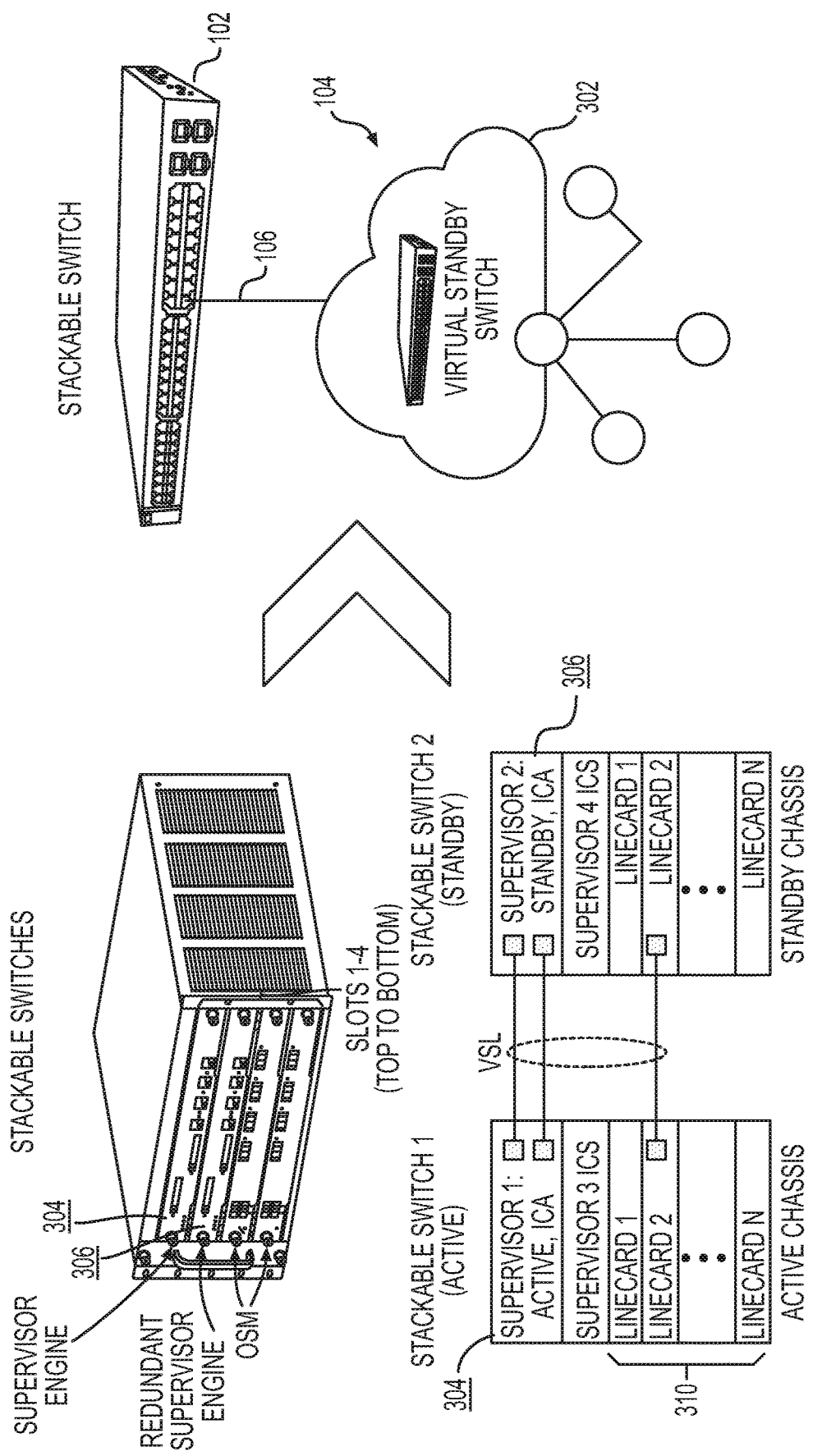
FIG. 3A shows a method of establishing a virtualized standby switch using virtualized hardware switchover operation in accordance with an illustrative embodiment.

FIG. 3A shows a method of establishing a virtualized standby switch (e.g., 104) using virtualized hardware switchover operation in accordance with an illustrative embodiment. In some embodiments, the virtualized hardware switchover operation (or virtualized stateful switchover operation) is based on a stateful switchover operation (SSO or SWO) configured to provide fault resistance capabilities for an active/primary stackable switch/chassis by employing a redundant supervisor engine (shown as 306), on a same or different chassis, having similar or same capabilities to the primary supervisory engine and hardware (shown as 304), to take over network operation of the primary supervisor engine (304) when the primary supervisory engine (304) fails or becomes unavailable. Stateful switchover operation relies on redundant hardware (e.g., 306) in a standby network device to take over operation of the active network device (e.g., 304) to continue to forward network traffic with no loss of sessions when the active network device becomes unavailable.

A standby network device forms a stack with the active device. Once a stacking configuration is formed between an active device and a standby device, SSO (Stateful synchronization Operation) automatically is initiated and continues until the configuration of active device is synchronized with Standby device. A trigger for SWO (SWitchover operation) is then provided and the Standby device takes over as the Active device, and prior active device goes through a reboot.

In FIG. 3A, the virtualized stateful switchover operation includes stateful switchover mechanisms to fully initialize the standby network device (shown as 104), e.g., via a Virtual Switch Link (VSL), after the device 104 has been orchestrated in a remote server or cloud server 302, and then synchronize critical state information between the active and standby processors. Virtualized stateful switchover operation performs the orchestration to instantiate the remote server or cloud server 302 and to establish a secure tunnel 106 between the remote/cloud server 302 and the active network device 102. In addition, the virtualized stateful switchover operation instantiates the control-plane-data-plane interface transport module (e.g., 120 and 122, respectively) in each of the network devices (e.g., 102, 104) to provide transport operations of control plane updates from the active network device (e.g., 102) to the virtualized standby network device (e.g., 104) and to provide transport operations of the resulting data plane updates back to the active network device (e.g., active stackable or non-stackable switch) from the control plane 116 of the virtualized standby network device (e.g., 104).

Figure 3B:
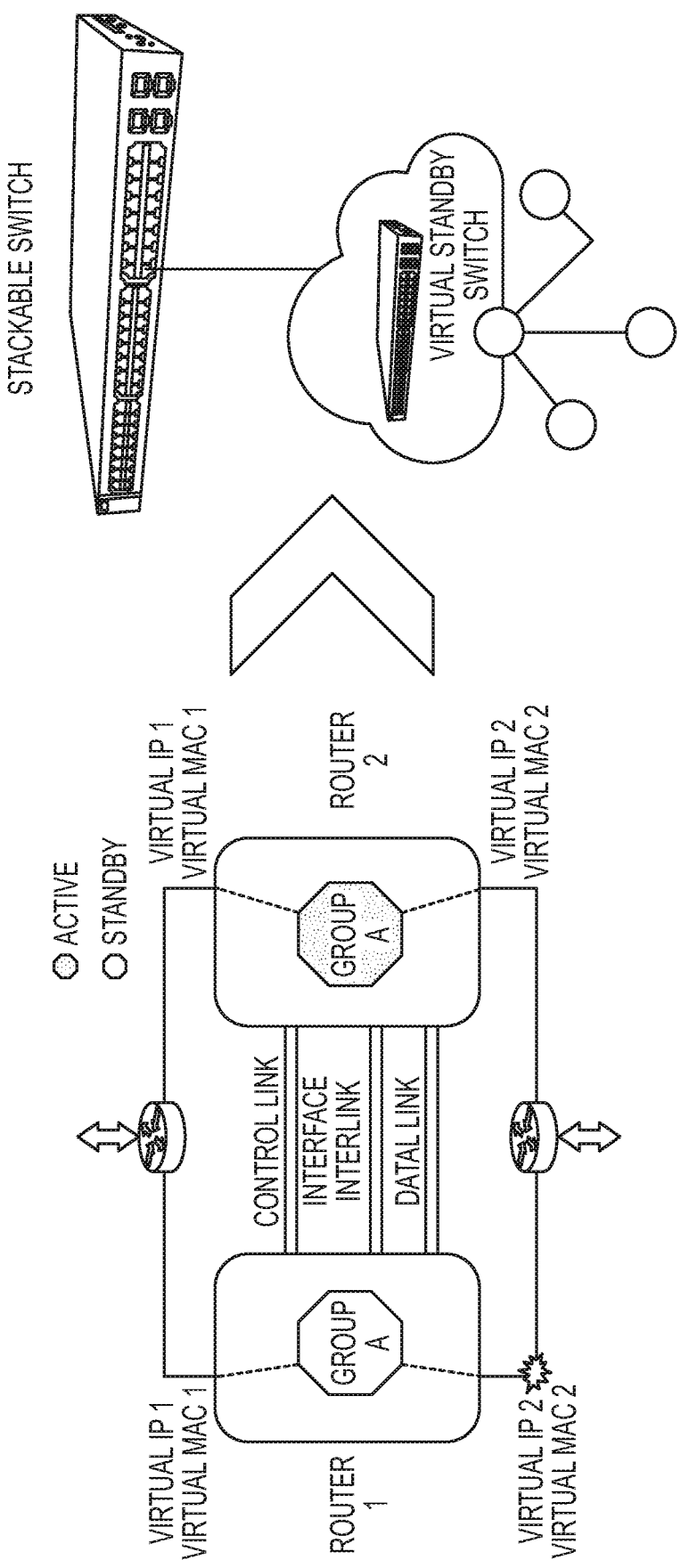
FIG. 3B shows another method of establishing a virtualized redundant switch, as another form of virtualized standby switch, using a virtualized high availability operation in accordance with an illustrative embodiment.

Example Orchestration of Virtualized Redundant Switch Using High-Availability Operation FIG. 3B shows another method of establishing a virtualized redundant switch, as another form of virtualized standby switch, using a virtualized high availability operation in accordance with an illustrative embodiment. To this end, the term "virtualized redundant switch" and "virtualized standby switch" are used interchangeably in the instant disclosure.

The virtualized high availability operation is derived from high availability (HA), or like, operation. In virtualized high availability operation, like high availability operation, the network devices are joined by a configurable control link and data synchronization link. The control link is used to communicate the status of the network devices. The data synchronization link is used to transfer stateful information to synchronize the stateful database for the calls and media flows. Each pair of redundant interfaces may be configured with the same unique ID number.

In FIG. 3B, the virtualized high availability operation includes high availability mechanisms to fully initialize a second and redundant network device after the virtualized network device has been orchestrated in a remote server or cloud server, and then synchronize state information between the active and redundant processors. Virtualized high availability operation performs the orchestration to instantiate the remote server or cloud server and to establish a secure tunnel between the remote/cloud server and the active network device. In addition, the virtualized stateful switchover operation instantiates the control-plane-data-plane interface transport module in each of the network devices to provide transport operations of control plane updates from the active network device to the virtualized standby/redundant network device (e.g., virtualized standby/redundant switch) and to transport the resulting data plane updates back to the active network device (e.g., active stackable or non-stackable switch) from the control plane of the virtualized standby/redundant network device.

Example Fast Upgrade System using a Virtualized Standby Switch

Figure 4:
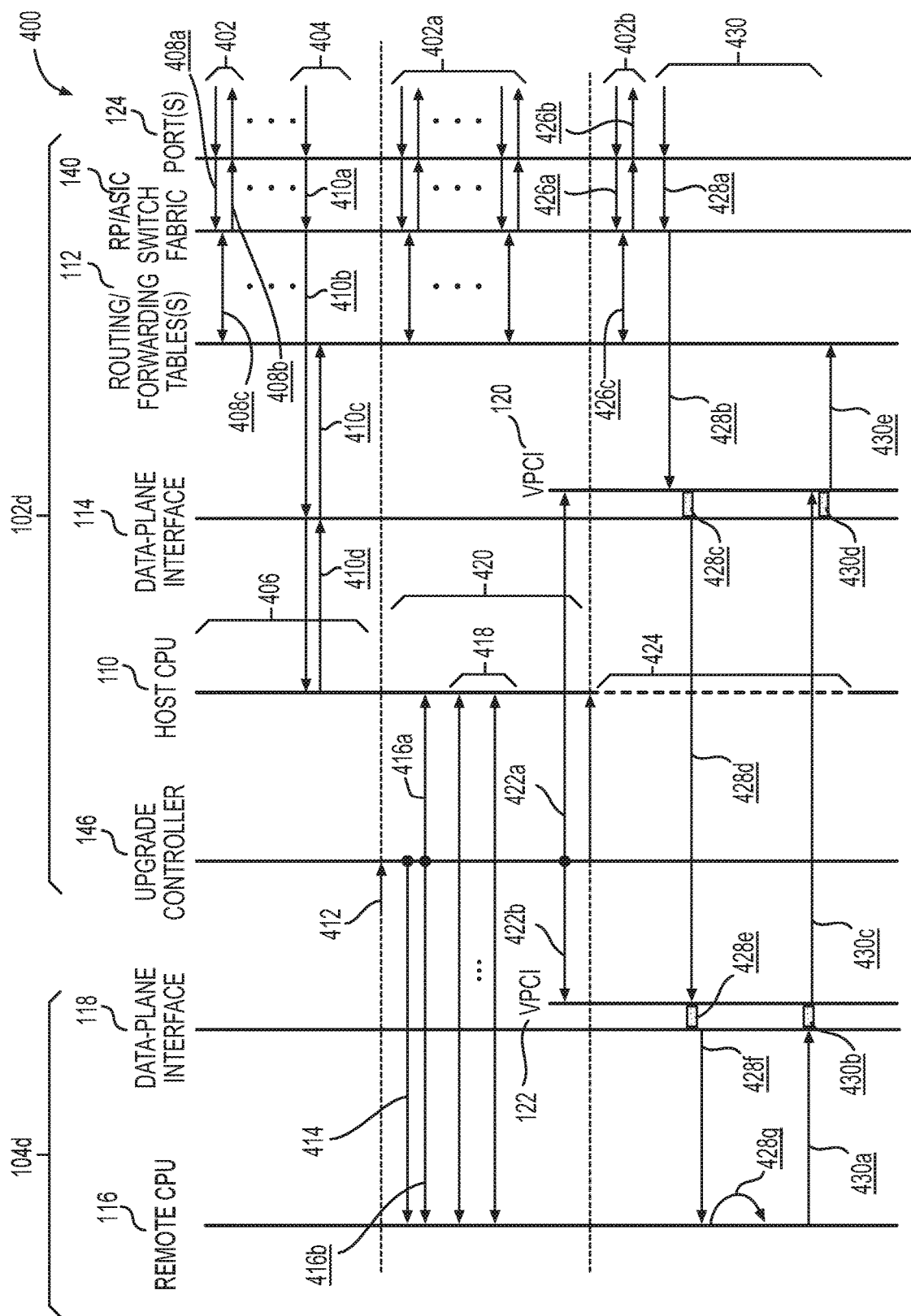
FIG. 4 shows an exemplary timing diagram of a virtualized hardware switchover operation between an active stackable network device and a virtualized remote/cloud standby switch in accordance with an illustrative embodiment.

FIG. 4 shows an exemplary timing diagram 400 of a virtualized hardware switchover operation between an active network device (shown as 102*d*) and a virtualized remote/cloud standby switch (shown as 104*d*) in accordance with an illustrative embodiment. In FIG. 4, prior to performing a virtualized hardware switchover operation (shown as 406), say, for a fast upgrade operation, for a standard data packet, the active switch 102*d* is shown (402, 402*a*) to receive (408*a*) the data packets at a port 124 (shown as "Port(s)" 124), which are routed (408*b*) by the forwarding engine 140 (shown comprising "RP/ASIC/Switch Fabric") to another port (still shown as 124) using (408*c*) data-plane-associated resources 112 (shown as "Routing/Forwarding Tables" 112). Also, in FIG. 4, for a control plane packet with a simple control plane update, the active switch 102*d* is shown (404) to receive the control plane packet at a port 124, which are routed (410*a*) through the forwarding engine 140 and routed (410*b*) through a bus interconnect 114 (shown as a "data-plane interface" 114) to the control plane 110 (shown as "host CPU" 110). In this example, the control plane 110*c* then updates (410*c*) a data-plane resource 112 by writing (410*d*) to the data plane interface 114.

In the example of an upgrade operation, and as shown in FIG. 4, the virtualized hardware switchover operation is initiated at step 412 with an upgrade command received (412) by an upgrade controller 146. In some embodiments, the upgrade controller 146 is an application executing a processing core or logic circuit at the active network device 102*d*. In other embodiments, the upgrade controller 146 is an application executing on the processing core or logic circuit at an external controller. The upgrade controller 146, in some embodiments, directs (414) the instantiation of a virtualized standby switch 104*d* in a remote or cloud infrastructure (e.g., remote or cloud server) to provide a redundant control plane 116 (shown as "Remote CPU" 116 and also referred to herein as control plane 116) to the control plane executing on the host CPU 110. The active network device 102*d* (as a physical switch) and the virtualized standby switch 104*d* preferably forms a stack, e.g., using HA operations, such as ISSU, SSO, or like synchronization and management operations. For simplicity, in this example, switchover, HA, ISSU, SSO synchronization operations will be referred to as switchover synchronization.

In some embodiments, instances of virtualized standby switches are pre-instantiated in the remote or cloud infrastructure to which the upgrade controller 146 can then direct the assignment of a pre-instantiated virtualized standby switch to the active network device 102*d*. Once instantiated, the active network device 102*d* and the virtualized standby switch 104*d* are joined in stacked mode with the active network device 102*d* set (416*a*) in active mode and the virtualized standby switch 104*d* set (416*b*) in standby mode. The active network device 102*d* then performs bulk synchronization operation of its control-plane state, as well as subsequent incremental synchronization (418), to the virtualized standby switch 104*d*.

During the initialization process (420), the control-plane-data-plane interface transport modules 120, 122 are initialized (shown as 422*a* and 422*b*) in the respective active network device 102*d* and virtualized standby switch 104*b*. In some embodiments, the upgrade controller 146 pushes the instructions for the control-plane-data-plane interface transport modules 120,122, or its equivalent, to the active network device 102*d* and virtualized standby switch 104*b*, e.g., as a part of the initialization process. In other embodiments, the system image for the active network device 102*d* and virtualized standby switch 104*d* includes the instructions for the control-plane-data-plane interface transport modules to which the upgrade controller 146 can then initialize.

The initialization process (420) ends once both the control planes 110, 116 of the active network device 102*d* and virtualized standby switch 104*b* are synchronized to have the same control-plane states, and the control-plane-data-plane interface transport modules 120, 122 are instantiated and executing. With the control-plane-data-plane interface transport modules 120, 122 executing to transport bus interconnect transactions between the physical and virtualized switches (102*d*, 104*d*), the control plane 110 of the active network device 102*d* (and not the data plane) can switch from an active mode to a standby mode, and the control plane 116 of the virtualized standby switch 104*d* can switch from the standby mode to the active mode. With the control plane 110 of the active network device 102*d* being in the standby mode, it can then be disabled (shown as 424), e.g., for a fast upgrade operation where it reboots to a new system image, or is rebooted. During this time, the data-plane of the active network device 102*d* continues its forwarding operations of packets and any control plane associated updated (e.g., to the data plane tables and resources or the control plane) are made by the secondary control plane 116 of the virtualized standby switch 104*d* by way of the control-plane-data-plane interface transport modules 120, 122.

In FIG. 4, during the virtualized hardware switchover operation (shown as 424), the data-plane of the active switch 102*d* continues to service received from the packets from the network. As shown, upon a data packet arriving (426*a*) at a port 124, the forwarding engine 140 routes (426*b*) the packet to another port 124 using (426*c*) data-plane-associated resources 112. And for control plane updates (430), the active switch 102*d* is shown to receive (428*a*) the control plane packet at a port 124, which are routed through the forwarding engine 140 and routed (428*b*) to the driver of a bus interconnect 114. These data and control-plane packets may be received from peer network devices (e.g., 504 shown in FIG. 5) as well as enterprise-level network controllers (e.g., Cisco Digital Network Architecture (DNA) controller, OpenStack controller, or the like, shown as 506 in FIG. 5). However, rather than the control plane 110 (which is unavailable) reading the bus interconnect 114, the control-plane-data-plane interface transport module 120d of the active switch 102d reads (428c) the bus interconnect 114 and transports (428d) the read transaction, as a message, through the network to the control-plane-data-plane interface transport module 122 of the virtualized standby switch 104d. The control-plane-data-plane interface transport module 122 then writes (428e) a transaction to the bus interconnect 118 of the virtualized standby switch 104d, which is then read (428f) by the control plane 116 of the virtualized standby switch 104d to process (428g) the control plane update.

In instances where the control plane has a data plane update, the control plane 116 writes (430a) to the bus interconnect 118. The control-plane-data-plane interface transport module 122 reads (430b) the transaction and transports (430c) the transaction, as a message, through the network, to the control-plane-data-plane interface transport module 120 of the active switch 102d. The control-plane-data-plane interface transport module 120 then writes (430d) the transaction to the bus interconnect 114 (as if written by the native control plane), which is written (430e) to the addressed data-plane resources.

It should be clear that even though the control plane of the active network device 102d is in standby mode, the data plane continues to maintain the same active mode. And, while the control plane of the virtualized standby switch is in active mode, the virtualized standby switch itself does not have a local data plane—the control plane of the virtualized standby switch serves to temporarily maintain hitless or near-hitless control-plane operations during the entire upgrade or reboot processes of the control plane of the active network device 102d.

Fast Upgrade System with Virtualized Stateful Switchover Operation

Figure 5:
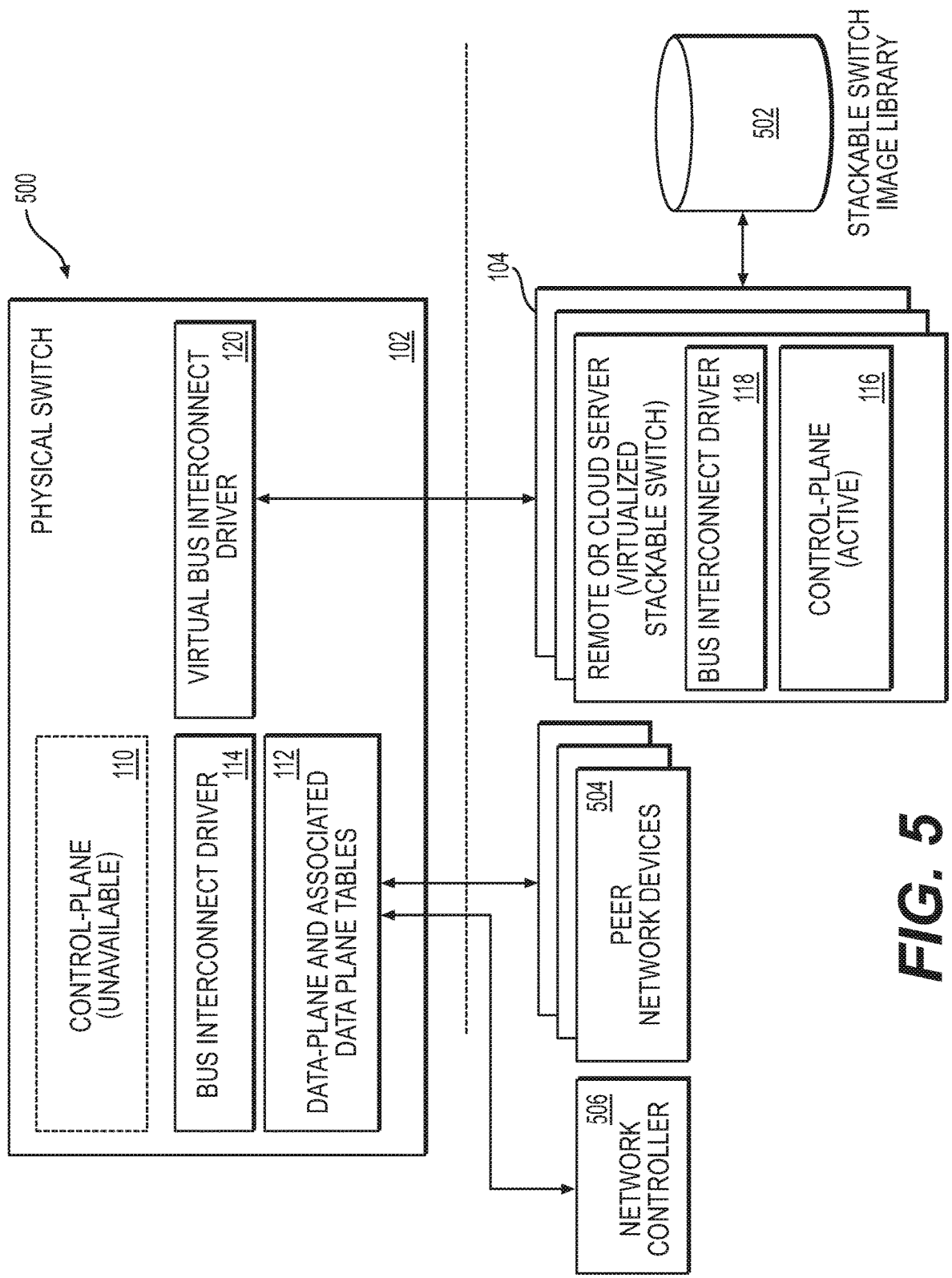
FIG. 5 shows an exemplary system configured to perform a fast upgrade operation using the virtualized hardware switchover operation in accordance with an illustrative embodiment.

FIG. 5 shows a system 500 configured to perform a fast upgrade operation using the virtualized hardware switchover operation in accordance with an illustrative embodiment.

As discussed above in relation to FIGS. 1-4, the fast upgrade operation generally include instantiating a virtualized switch (e.g., a virtualized standby switch) on a cloud or a local/remote server that has connectivity to a physical switch (e.g., an active stackable or non-stackable switch). And as discussed, in some embodiment, the local/remote server is implemented in a mobile computing device, e.g., a laptop, tablet, small compact-factor single board computers, mini-PC, stick PC, and the like. The physical switch and the virtual switch then can form a stack, e.g., using processes of software upgrade using HA, such as ISSU and SSO mechanisms and similar to a set of two physical switches in a stack configuration mode. The physical switch and the virtual switch may form a stack using front-side stacking (SVL), e.g., using front-panel port access.

In some embodiments, in addition to using HA, such as ISSU and SSO mechanisms, the virtualized switch is further configured to execute both the control-plane software of the physical switch and the data-plane drivers, including, for example, forwarding engine driver (FED), forwarding engine SDK (software development kit), and ASIC drivers. In FIG. 5, the control plane software/instructions may be stored and retrieved from a stackable switch image library (shown as 502) or upgradable switch image library (e.g., for non-stackable switches). In some embodiments, the library 502 is stored in a remote or cloud server. An example of a remote or cloud image library system is Cisco Software Image Management (SWIM) system. In other embodiment, the library is a computer readable medium (e.g., DVD, CD, compact flash, and other persistent memory device).

The device access layer (e.g., data-plane access layer) in the data-plane driver of the virtualized switch may implement a logical data-plane interface (e.g., virtual PCI (vPCI), Virtual AXI (vAXI), and other control-plane-data-plane interface transport modules) to provide communication between the data-plane drivers running on the virtualized switch and the data-plane of the physical switching. The data-plane drivers in the virtualized switch may be masked to the underlying data-plane device (or the logical data-plane interface endpoint) and the control plane of the virtualized switch can view and access the entire memory map of the data-plane device. A logical data-plane interface of the active switch may implement a tunnel (or a socket) implemented using technologies such as GRE, VxLAN, or similar mechanisms. Raw register/memory access operations are then sent and received over the logical data-plane interface.

In general, the data-plane device in the physical switch are configured to send punt packets, switch ASIC packet-descriptors, and other management packets to the virtualized switch. This can be realized through GRE, VxLAN, or similar mechanisms, as discussed above. The punt packet along with the Switch ASIC Packet-descriptors may be encapsulated with stack header and then an appropriate tunnel header.

Functionally, the virtualized switch is equivalent to another physical switch during the software upgrade.

Figure 6:
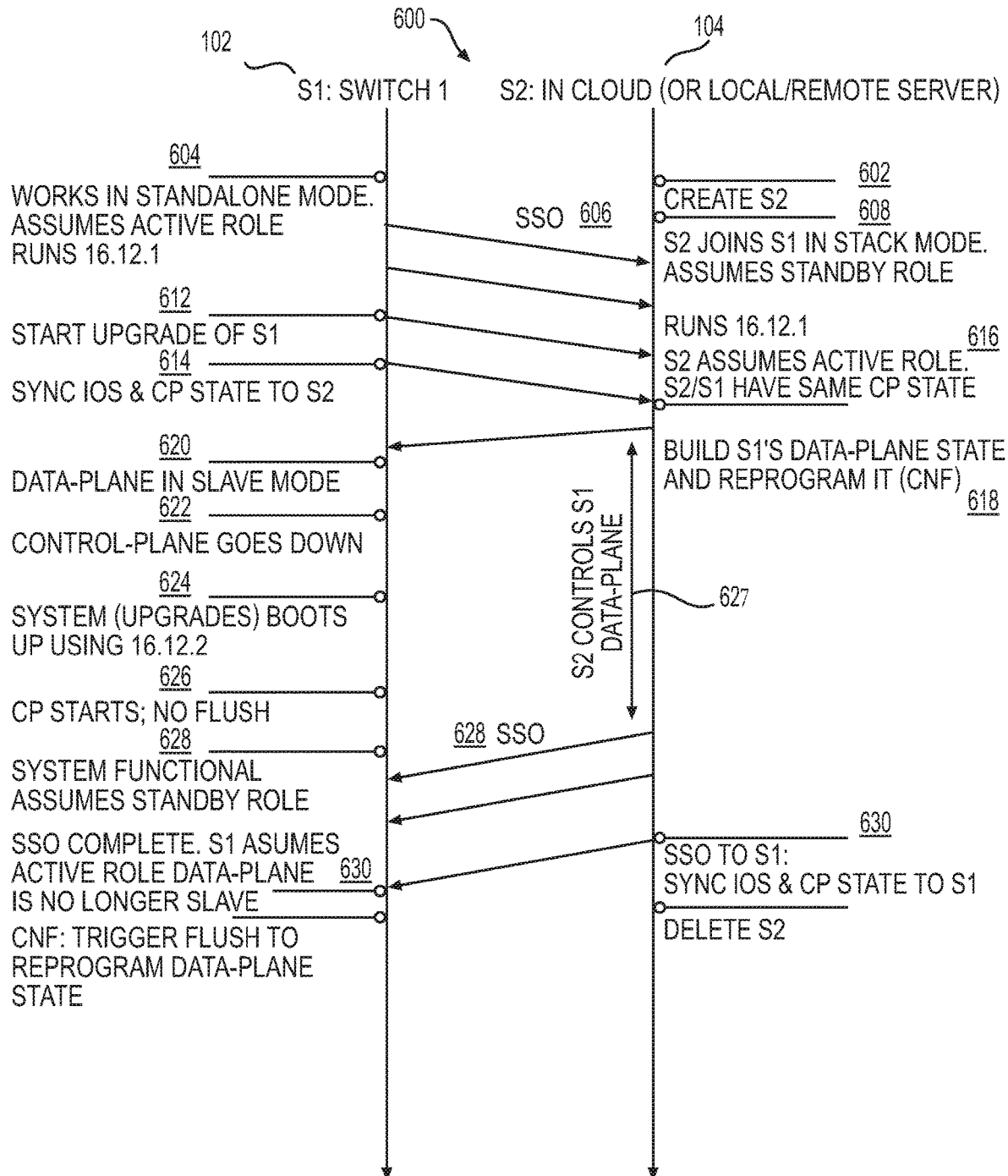
FIG. 6 shows a timeline for a fast upgrade operations using an exemplary virtualized hardware switchover operation in an accordance with an illustrative embodiment.

FIGS. 6 and 7A-7D show an example fast upgrade operation using the virtualized hardware switchover operation in accordance with an illustrative embodiment. FIG. 6 shows a timeline for a fast upgrade operations using an exemplary virtualized hardware switchover operation while FIGS. 7A-7D show sub-operations that may be performed.

In FIG. 6, the process 600 is shown to include a virtualized switch "S2" (shown as 104) being first instantiated (shown as "Create S2" 602) in a cloud, local, or remote machine to be used to upgrade a physical switch "S1" (shown as 102). In some embodiments, other computing device may be used to host the virtualized standby switch, including portable computing devices as discussed herein.

The physical switch "S1" 102 is shown running (604) in standalone mode and is operating in active mode within a switchover operation. In FIG. 6, the physical switch is shown to be executing switch image version "16.12.1". The instantiation may include the creation of a container or virtual machine in such infrastructure along with an operating system, drivers, and control-plane application(s) as described in relation to FIGS. 4 and 5. In some embodiments, the instantiation is directed by a upgrade controller, which may be executing on the physical switch "S1" or a remote computing device.

After the virtualized switch "S2" 104 is instantiated, an SSO operation is triggered (shown as "SSO" 606). In operation 606, the virtualized switch "S2" 104 is joined (608), e.g., via SVL connectivity (where SVL is StackWise Virtual), in standby mode to the active switch "S1" (shown as "S2 joins S1 in stack mode" 608) and bulk synchronization (the start is shown as 606 and the end is shown as 614) is performed. The SVL is an inter-chassis system link between two stack members in an SVL domain. An SVL connection may not run any network protocol and may remain transparent in Layer 2 and Layer 3. The virtualized standby switch "S2" 104 is also executing the same or compatible system image as the physical switch "S1" 102, shown as switch image version "16.12.1".

The software upgrade process is then started (612) and the physical switch "S1" 102, as the active node, continues to perform bulk synchronization operation (608, 614) until step 614. The bulk synchronization (606) synchronizes the control-plane state to the virtualized switch "S2" 104 so the control-plane states of the switches "S1," and "S2" 102, 104 are the same. During the synchronization, the physical switch also prepares for reboot and/or upgrade.

Figure 7A:
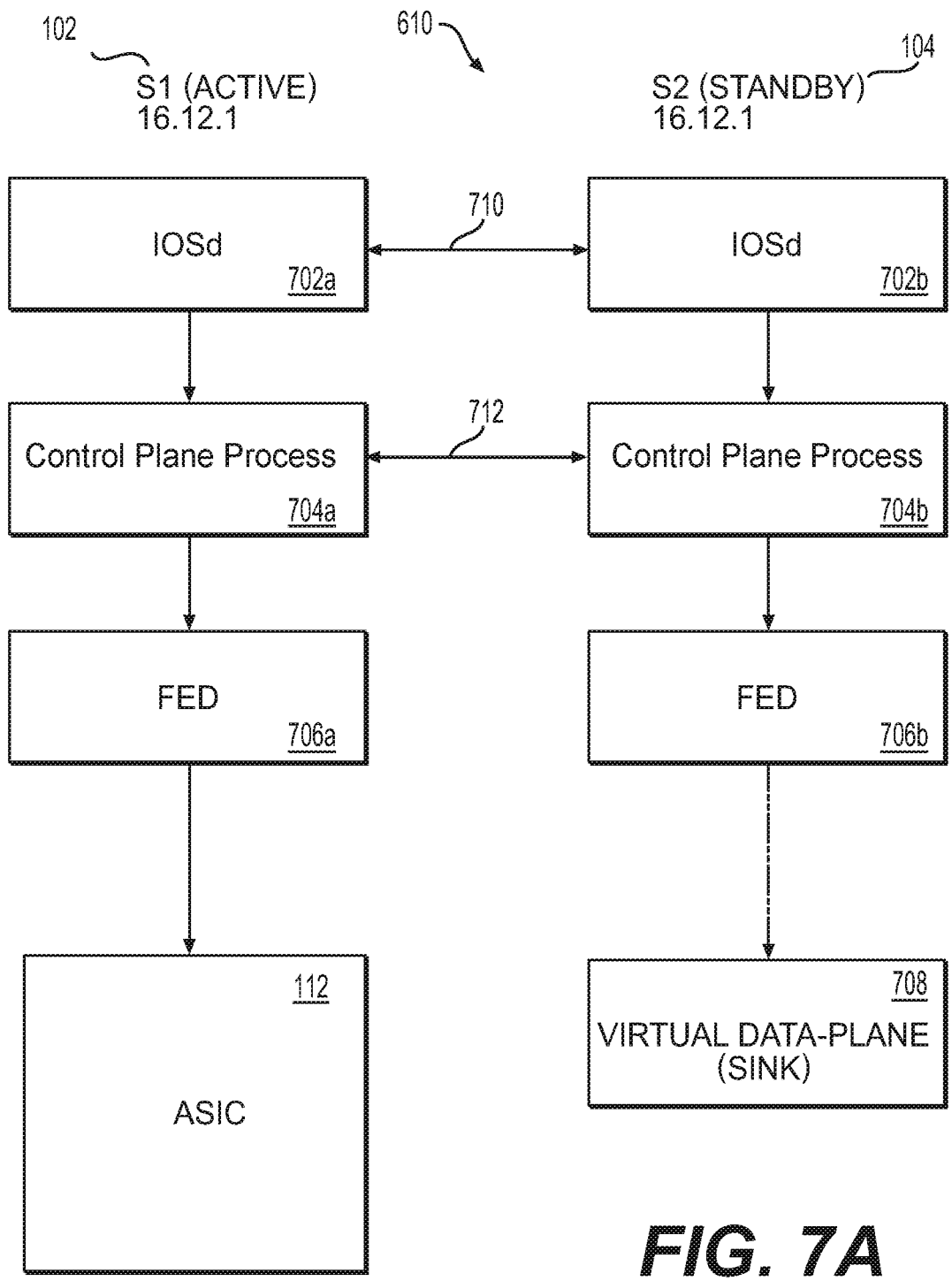
FIG. 7A is a diagram illustrating an example synchronization operation between the active and standby switches for one class of switches following commissioning of a virtualized network device.

FIG. 7A is a diagram illustrating an example synchronization operation 608, 614 between the active and standby switches for one class of switches. It should be understood that similar, though different synchronization operations, may be performed for other classes of switches.

In this example, the class of devices in the example has a control plane that is separate to the forwarding plane, and any update is passed from the control plane to the data plane through the data flow shown in FIG. 7A. Specifically, in FIG. 7A, each of the physical and virtualized switches "S1" and "S2" is executing a control plane daemon process ("IOSd") (shown as 702a and 702b, respectively) and a control-plane forwarding manager process 704 ("Control Plane Process") (shown as 704a and 704b, respectively). The control plane daemon process ("IOSd") 702a, 702b send updates to the control-plane forwarding manager process 704a, 704b, respectively, which sends updates to the forwarding engine driver ("FED") (shown as 706a and 706b, respectively), which provides the driver interface to the ASIC and forwarding plane hardware of the switch (shown as 112). Because the virtualized switch 104 is a computing device in the cloud, local, or remote machine (or portable machine), it does not include a data-plane and the forwarding engine driver ("FED") 708 is shown to write to a virtual data-plane. In some embodiments, the virtual data-plane is a memory table or other addressable construct that is similar in construct to the data-plane (e.g., 112e).

For the synchronization process 614, the control plane daemon process ("IOSd") 702a of the physical switch "S1" 102 is synchronized (710) to the control plane daemon process ("IOSd") 702b of the virtualized switch "S2" 104. And, the control-plane forwarding manager process 704a of the physical switch "S1" 102 is synchronized (712) to the control-plane forwarding manager process 704b of the virtualized switch "S2" 104. As noted, in the case of the virtualized switch "S2" 104, the data-plane may be a NULL (sink). Indeed, bulk synchronization operations and incremental synchronization operations (614) may be performed in this manner.

Referring back to FIG. 6, subsequent incremental synchronization operation (614) may also be performed to maintain control state synchronization between the physical and virtualized switches "S1" and "S2" 102, 104. In some embodiments, the control-plane state is synchronized by the control plane daemon process ("IOSd") and control-plane forwarding manager process between physical switches and virtualized switches "S1" 102 and "S2" 104, for example, as described in relation to FIG. 7A.

Once the control-plane states are synchronized to the same states, the virtualized switch "S2" 104 is directed to assume the active role while the physical switch "S1" 102 assumes the standby role. Once in the active role, the virtualized switch "S2" 104 prepares (618) the state of the data-plane device and programs it, e.g., in some embodiments, using the logical data-plane interface (e.g., vPCI), which may be initiated at this sequence. In other embodiments, the data-plane device 112 may be programmed by the control plane 110 of the physical switch "S1" 102 prior to it becoming unavailable and under direction from the control plane of the virtualized switch. The programming ensures the association of resources and their addresses are consistent between the control-plane and data-plane on the physical and virtualized switches "S1" 102 and "S2" 104. Without the programming operation, the data-plane state may have different table indexes or addresses in the data-plane even though the control-plane state of the physical and virtualized switches "S1" and "S2" 102, 104 may be identical because the order of operations at the control-plane may not be preserved or performed in the same sequence. To optimize the programming of the data-plane device 112 of physical switch "S1" 102, in some embodiments, the data plane device may be programmed for only resources where such change is expected or had been made. As noted, programming may be implemented using via either logical data-plane interface, or through the control-plane 110 of the physical switch "S1" 102.

In yet another embodiment, the programming may involve generating an index translation table that translates addresses between i) old indexes associated with the data plane resource of the physical switches "S1" 102 and ii) new indexes associated with the data plane resource of the virtualized switches "S2" 104. The translation can improve the network/switch availability as the programming may be performed very quickly without having to write over data-plane resources of the physical switch "S1" 102. Indeed, once a mapping between old and new indexes are generated, 'read' and 'write' operations can go through the translation table, and the correct indexes/addresses can be accessed.

Following the synchronization of the data-plane states between the physical and virtualized switch "S1" and "S2" 102, 104, the physical switch "S1" 102 configures its data plane 112 to switchover to operate in slave mode (620) to the control plane 116 of the virtualized switch "S2" 104. Subsequently, the host-CPU of the physical switch "S1" 102 is disabled (622) and undergoes reboot operation (624). In an upgrade operation, the host-CPU reboots (624) to a new system image. In a reboot operation, the host-CPU reboots (624) to the same system image. The data-plane 112 continues to operate in the slave mode (620), shown for the duration 627, in which it is controlled by the control plane 116 of the virtualized switch "S2" 104 until the control-plane 110 of the physical switch "S1" 102 is restored.

Figure 7B:
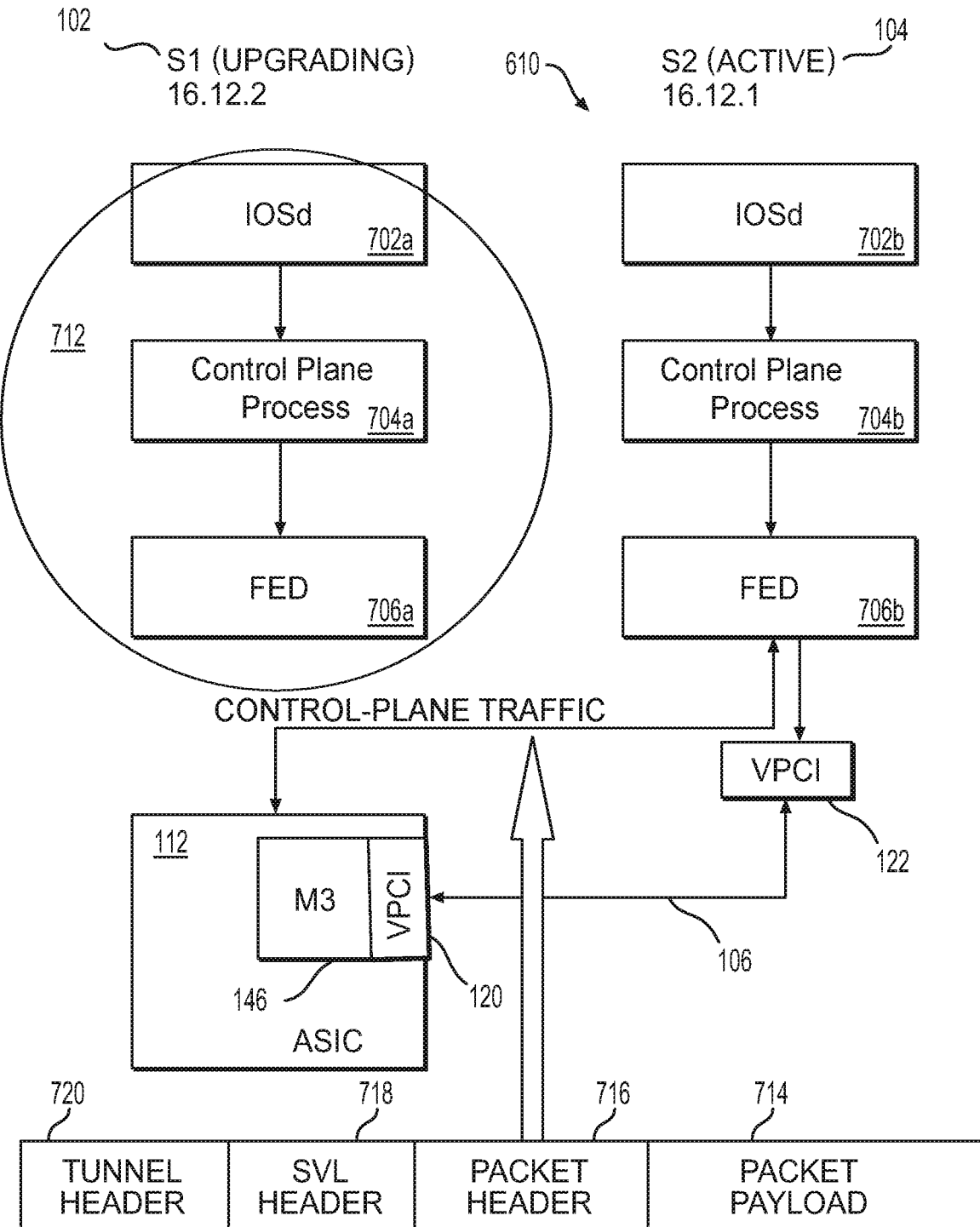
FIG. 7B is a diagram illustrating a physical switch performing a reboot/upgrade while in slave mode to the control plane of the virtualized switch.

FIG. 7B is a diagram illustrating the physical switch "S1" 102 operating a reboot/upgrade operation while in slave mode to the control plane 116 of the virtualized switch "S2" 104. In FIG. 7B, the control plane of the physical switch "S1" 102, comprising the control plane daemon process 702a, the control-plane forwarding manager process 704a, the forwarding-plane forwarding manager 706a, and the forwarding-plane driver 708a are disabled, and the control-plane-data-plane interface transport module (e.g., vPCI) 120, 122 facilitates the transport of data plane updates and control plane updates between the physical switch "S1" 102e and the virtualized switch "S2" 104c.

In FIG. 7B, an update by the control plane of the virtualized switch "S2" 104c is directed through the control plane of the virtualized switch "S2" 104c, comprising the control plane daemon process 702b, the control-plane process 704b, and the forwarding-plane driver 706b. The control-plane process 704b writes, e.g., to the FED (forwarding engine driver), which translates it to raw bus-address/value pairs. VPCI takes these raw bus-address/value tuples, and transmits to physical device. And the control-plane-data-plane interface transport module "VPCI" 122 transmits the update as a message over a network link 106 to a corresponding control-plane-data-plane interface transport module "VPCI" 120 executing at the physical switch "S1" 102. In the example of FIG. 7B, the control-plane-data-plane interface transport module "VPCI" 120 is executing in an upgrade processor (shown as a "M3" processor) as described in relation to FIGS. 1A, 1B, and 1C. The control-plane-data-plane interface transport module "VPCI" 120 provides the update to the upgrade processor 146 which writes it to the addressed data-plane resource (shown as "A SIC" 112). In some embodiments, the logical data-plane interface (e.g., VPCI) can work at higher-level transactions can operate on address/value tuples. In other embodiments, the logical data-plane interface (e.g., VPCI) can work on table/index/value tuples.

For control-plane updates from control-plane packets received at the physical switch "S1" 102, the control-plane updates are sent from the data plane 112 as control-plane traffic, e.g., via GRE/VxLAN protocol, to the forwarding-plane driver 706*b*, which relays the control-plane update to the control plane, i.e., host CPU 116, of the virtualized switch "S2" 104. As discussed, other protocols may be used. In FIG. 7B, an example structure of a GRE/VxLAN message is shown, which includes a packet payload 714, which is encapsulated by a packet header 716, an SVL header 718, and a tunnel header 720.

Referring back to FIG. 6, in the example of an upgrade operation, once the control plane of the physical switch "S1" 102 is brought down, the operating system is booted up (624) with a new system image (shown as image version "16.12.2" from image version "16.12.1"). During the software upgrade, the host CPU is booted with a different and new kernel/system image. Once the kernel is loaded, the operating system is booted. In network devices manufactured by Cisco Technology, Inc, (San Jose, Calif.), operating system may include IOS XE, IOS XR, & IOS Classic. Other operating systems maybe similarly rebooted.

Following bootup of the operating system, the control plane of the physical switch "S1" 102 is restored (i.e., booted up (626)) and is placed in standby mode. Once in the standby mode, the control plane of the virtualized switch "S2" 104 then performs (628) a control-plane synchronization (e.g., bulk synchronization) to the physical switch "S1" 102.

Figure 7C:
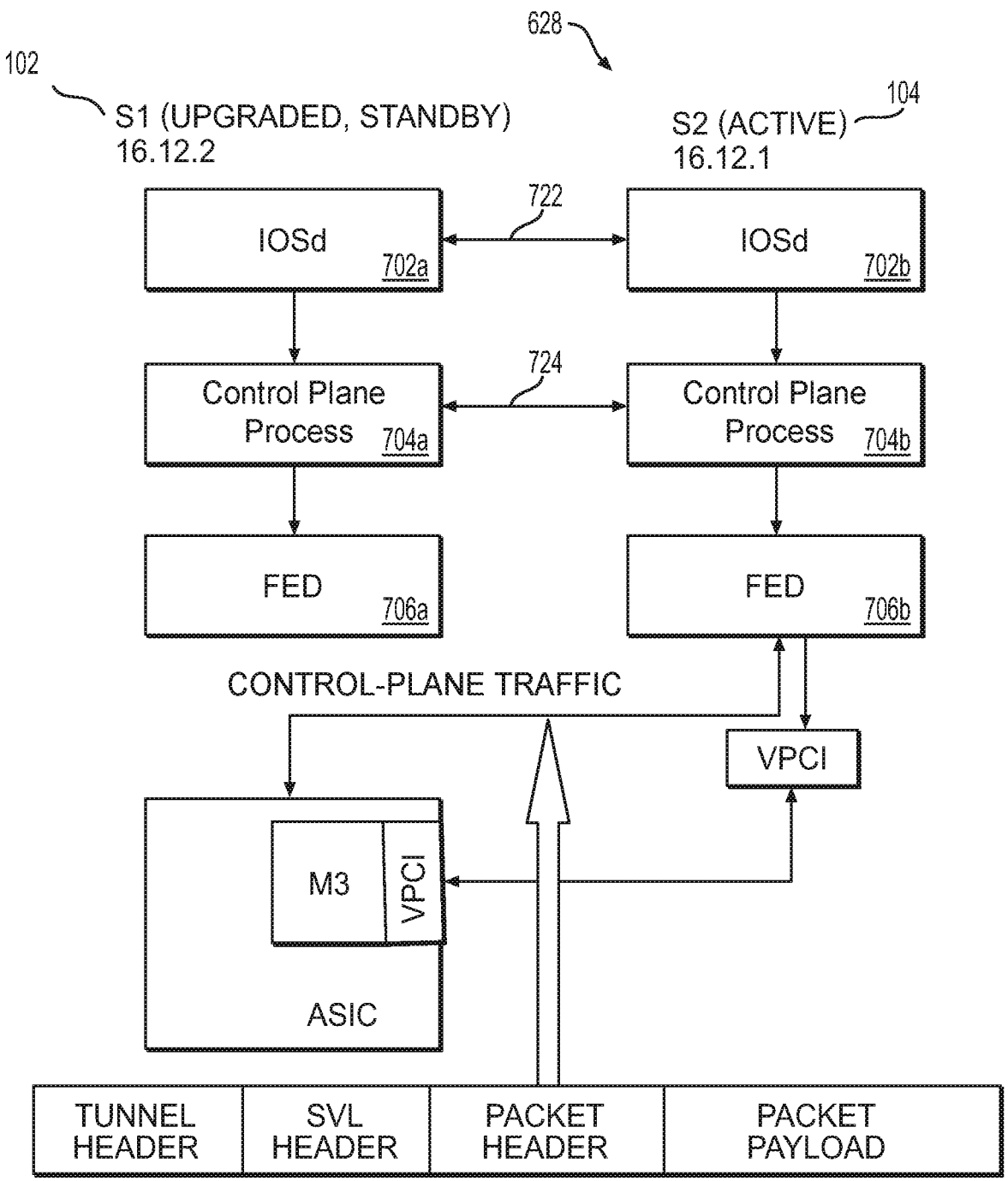
FIG. 7C is a diagram illustrating an example synchronization operation between the active control plane of the virtualized switch and the standby control plane of the physical switch.

FIG. 7C is a diagram illustrating an example synchronization operation (628) between the active control plane of the virtualized switch "S2" 104 and the standby control plane of the physical switch "S1" 102. Similar to FIG. 7A, with restoration of the control plane of the physical switch "S1" 102 in to standby mode, each of the physical and virtualized switches "S1" and "S2" is thus executing a control plane daemon process ("IOSd") 702*a* and 702*b*, respectively, and a control-plane forwarding manager process 704*a* and 704*b*, respectively.

As part of the synchronization operation (628), the control plane daemon process (IOSd) 702*b* of the virtualized switch "S2" 104 is synchronized (722) to the control plane daemon process (IOSd) of the physical switch "S1" 102. And, the control-plane forwarding manager process 704*b* of the virtualized switch "S2" 104 is synchronized (724) to the control-plane forwarding manager process 704*a* of the physical switch "S1" 102. Bulk synchronization operations and incremental synchronization operations (628) may be performed in this manner.

Figure 7D:
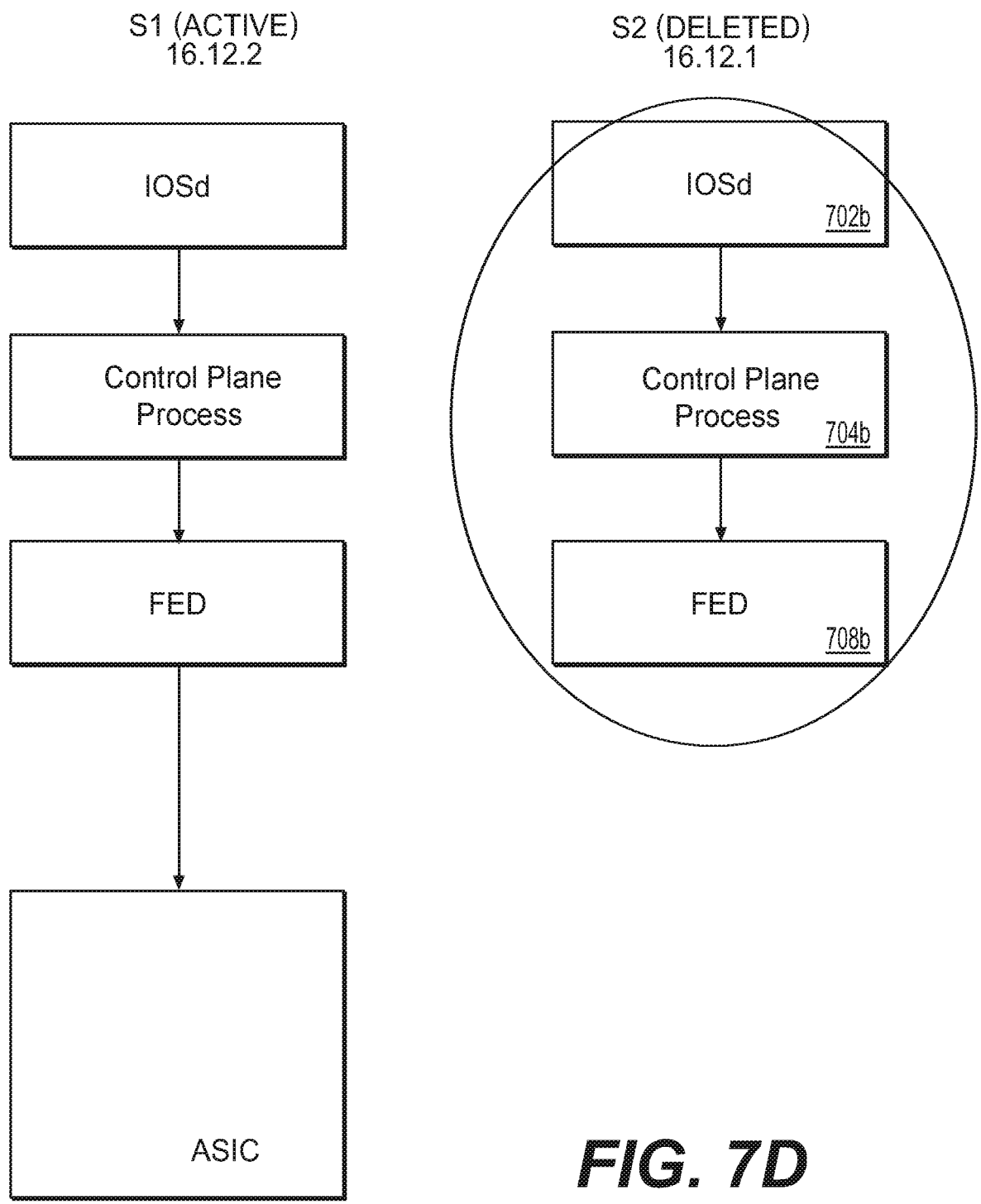
FIG. 7D is a diagram illustrating an example to dynamically delete a virtualized network device following an upgrade operation.

Once the control-plane states are synchronized to the same states, the physical switch "S1" 102 switches over (628) and is directed to assume the active role and the virtualized switch "S2" 104 is directed to assume the standby role. Subsequently, the container or virtualized instance of the virtualized switch "S2" 104 may be deleted. In FIG. 7D, the control plane is shown to be deleted.

Once in the active role, the physical switch "S1" 102 prepares the state of the data-plane device and programs it, e.g., in some embodiments, using the logical data-plane interface (e.g., vPCI), which may be initiated at this sequence. In other embodiments, the reprogramming of the data-plane of physical switch is not necessary. In yet other embodiments, a mapping database may be created, which maps the indexes of new image (16.12.2) to the indexes of the old image (16.12.1). In some embodiments, cache and flush operation is performed. Example and further description of cache and flush is provided in U.S. application Ser. No. 16/542,183, filed Aug. 15, 2019, which is incorporate by reference herein in its entirety.

Discussion

Software upgrade operation on non-redundant switches can cause the control plane to go down for the entire duration of upgrade. During this time, the switch may be running a stale data-plane, and any protocol State Machine changes are lost. This operation can take several minutes, and is not operationally acceptable for certain applications.

Having the ability to perform software upgrade while keeping the entire control-plane up is a unique aspect of the instant embodiments. There may be solutions to facilitate partial control-plane response. Most requires a designer to choose what control-plane events to track and respond. Mimic keep-alive packet have been used for selective L2 protocols which are sent on a regular basis from the data-plane. The mimic keep-alive packets prevents a link from going down while control-plane is being upgraded, but because the same static set of packets are repeatedly transmitted irrespective of the peer state, the technique can lead to instability if peer nodes are changed.

Stacking mechanisms provide redundancy but require redundant hardware. Cloud/controller managed switches are completely cloud-managed services with almost a complete separation of control-plane (in the cloud) and data-plane (on the physical device). Examples include OpenFlow and P4 switches. The control-plane runs in the cloud along with a thin protocol layer and drivers while the data-plane run on the physical switch. The protocol layer provides interfaces that can be accessed from cloud applications and controllers. Cloud-managed switches often require comparatively infrequent switch software upgrades, however, if the switch software needs an upgrade, it will suffer the same downtime problems as seen in traditional switches.

Near-hitless operation of core routers is a requirement of most core or backbone operations. The same or similar near-hitless operation requirements are being extended to access and campus networking. Certain real-time factory and distribution control automation may incur substantial financial impact for each minute of network outage. Hospitals and IoT applications may have real-time and life-critical applications, and cannot tolerate network downtime.

Modular platforms (e.g., Cisco Catalyst 9400) are designed and implemented with inherent redundancy having both active and standby supervisors or RP modules handle control-plane. Software upgrade may be done through ISSU with very low data-plane and control-plane impact. Non-redundant switches on the other hand, do not have an active/standby and the software upgrade process is intrusive, impacting data-plane (for seconds) and control-plane (for minutes).

Multiple non-redundant switches can be connected and represented as a single larger system and is known as Stacking configuration mode. It could use either back-side or front-side (e.g., SVL) stacking. A stack of switches appears to the rest of the network as one single switch. This makes it easier to manage and configure. Since there is more than one processor sub-system that can host the control-plane, a stacked system has redundancy with 'active' and 'standby' capable of handling the entire stack on their own. SSO is the mechanism for state synchronization between and active and standby in a redundant system. This can occur in either a modular dual supervisor or a stacked system. This can also provide hitless or near-hitless software upgrade capability for stacked switches.

In general, SSO works by synchronizing startup and running configurations from 'active' to 'standby'. Applications continue to sync all their state data between 'active' and 'standby' using this mechanism. On a switchover operation (aka, SWO), state reconciliation is not needed since the state has already been kept in sync by the applications.

In the context of software upgrade of a modular or a stacked system, the 'standby' unit takes over control-plane processing duties while the 'active' upgrades to a different release. This process is commonly referred to as ISSU, and used to either upgrade or downgrade images on platforms that support SSO. This minimizes downtime and degradation of service. During the upgrade process, Active and Standby units will have different versions of software.

While the control plane stays up during ISSU of a stacked system, it may not be able to update the data-plane of the switch during image upgrade, since it is likely that the modules that interact with the active control-plane, as well as the ASIC drivers are also being upgraded.

Figure 8:
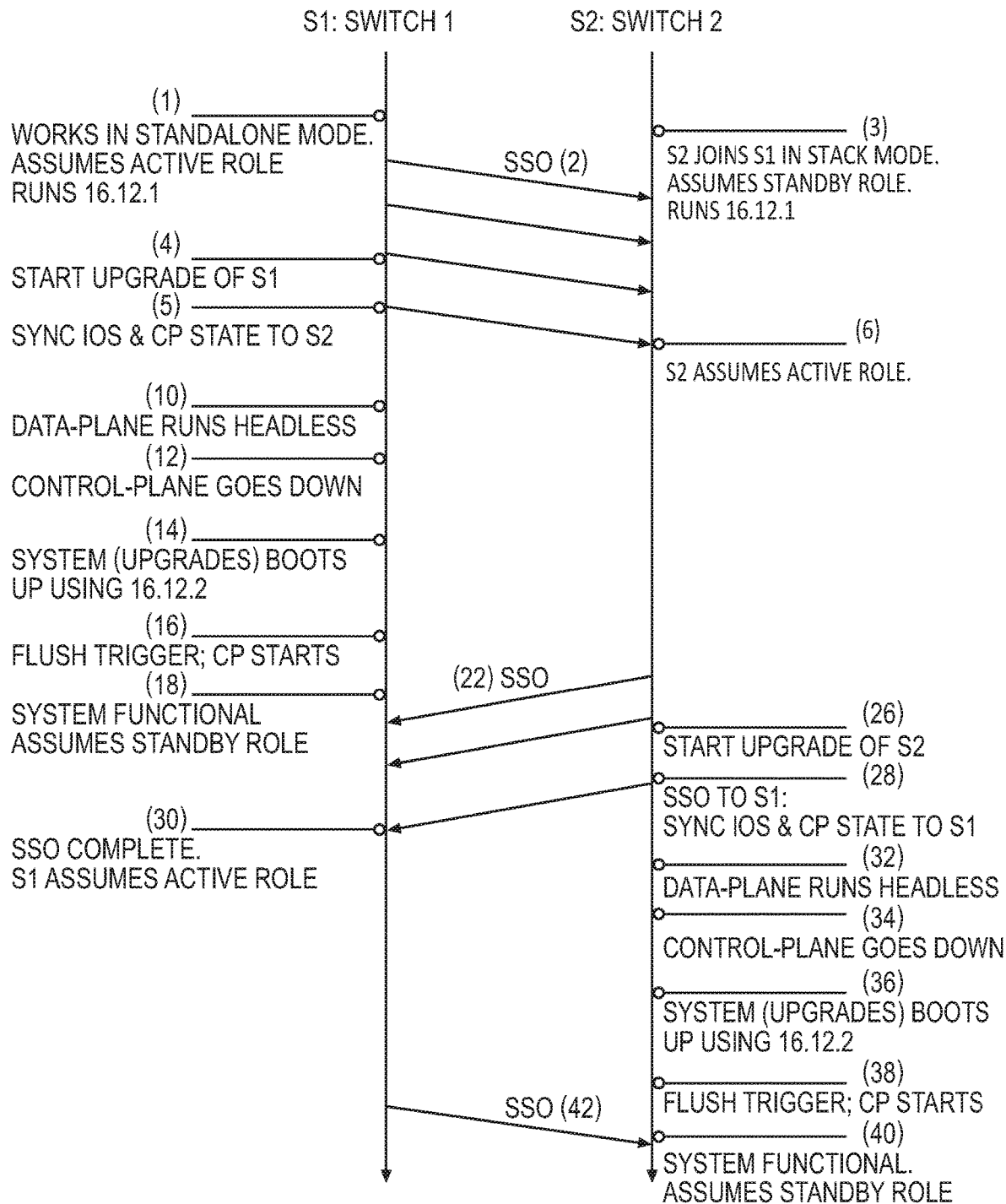
FIG. 8 is a diagram showing software upgrade in a stacking system in accordance with an illustrative embodiment.

FIG. 8 is a diagram showing software upgrade in a stacking system in accordance with an illustrative embodiment. In FIG. 8, two switches ("S1" and "S2") in a stacked configuration are being upgraded from one version of software to another (shown as "16.12.1" to "16.12.2") using conventional switchover operations. The redundant switch "S2" is powered on and joins the upgrading switch "S1" in stack mode (3) and assumes 'standby' role. The upgrading switch "S1" (active node) performs a bulk synchronization operation (2) and subsequently performs an incremental synchronization operation of its control-plane state to the standby node. Both the upgrading and redundant switches "S1" and "S2" are synchronized and have the same control-plane state. The upgrading switch "S1" then starts the software upgrade, which leads to redundant switch "S2" assuming the 'active' role. Subsequently the host-CPU on the upgrading switch "S1" goes through reboot (12 & 14). When the upgrading switch "S1" is booted up with the new 16.12.2 image, it assumes the 'standby' role (18). The redundant switch "S2", which is playing 'active' role, then performs the control-plane synchronization to the upgrading switch "S1" (22). Once the upgrading switch "S1" has completed its upgrade, the redundant switch "S2" starts its upgrade. (26), and a similar process is applied on the redundant switch "S2" (steps 26 through 40). Subsequently, both the upgrading switch "S1" and redundant switch "S2" are upgraded from versions 16.12.1 to 16.12.2.

In contrast to such operation, the exemplary system and method provides for the dynamic creation and deletion of a remote virtual switch. The exemplary system and method may involve stack formation between physical and virtual switches where the physical switch may be a non-redundant device (i.e., a standalone device). The exemplary system and method may employ control-plane state synchronization across physical and virtual switches. The exemplary system and method may use virtual switch to manage the data-plane device (Switching ASIC, NPU, etc.) state of the physical switch, while the control-plane is upgrading. The exemplary system and method may update data-plane state of the physical switch even during the upgrade process. For example, newly learnt MAC entries can be configured, LACP can update EtherChannel membership, among others. The exemplary system and method provides a temporary operation during the software upgrades.

Indeed, non-redundant switches configured with the exemplary system and method can maintain near-hitless control-plane operation during the entire upgrade process, which in turn helps to keep data-plane state up-to-date. In some embodiments, the exemplary system and method is configured to use stacking and HA mechanisms in conjunction with a virtual switch. One or more virtual switches may be spun up in the cloud for a scalable and low-cost mechanism to upgrade a large network.

The exemplary system and method may operate with network management solutions such as DNAC (DNA Center with Assurance) and SWIMS (software image management). HA, such as ISSU, SSO and Stacking technologies are well-proven and readily available on switch platforms. The exemplary system and method, in some embodiments, can use such infrastructures as-is, and extends the infrastructure with i) a logical data-plane interface (vPCI, vAXI, etc.) on embedded micro-controller (M3 on Doppler ASICs), ii) enhancements to run binos/Polaris in a cloud and remote server environments, iii) provides commissioning/decommissioning operation of a 'virtual switch' in a stacking configuration. In some embodiments, the exemplary system and method can implement a cache and flush operation for incremental control-plane state updates. Indeed, any updates to the protocol behavior or bootup sequence may be performed without knowledge by the software upgrade process.

It should be understood that the various techniques and modules described herein, including the control-plane-data-plane interface transport module may be implemented in connection with hardware components or software components or, where appropriate, with a combination of both. Illustrative types of hardware components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. The methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium where, when the program code is loaded into and executed by a machine, such as a computer, the machine becomes an apparatus for practicing the presently disclosed subject matter.

Embodiments of the network device may be implemented, in whole or in part, in virtualized network hardware in addition to physical hardware.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents.

What is claimed is:

1. A network device comprising:
    a host processor executing instructions for control-plane operations that manage and maintain a plurality of data-plane-associated tables of a switch-fabric of the network device;
    a network interface;
    a memory having computer readable instructions, wherein execution of the computer readable instruction, cause the host processor to:
        establish, via the network interface, a network connection with a remote computing device comprising a remote processor;
        direct the remote computing device to instantiate a virtualized standby switch, wherein the instantiated virtualized standby switch is configured to execute a set of instructions to manage and maintain the plurality of data-plane-associated tables of the switch-fabric of the network device;
        synchronize control-plane states of the virtualized standby switch with control-plane states of the network device; and
        reset the host processor to boot-up with a new system image in an upgrade or boot-up process, wherein during the upgrade process, the virtualized standby switch is configured to update, via data-plane transaction messages over the network interface, one or more of the plurality of data-plane-associated tables, and states of the network device, wherein the virtualized standby switch provides near-hitless operation of the network switch while the host processor is unavailable during the upgrade or boot-up process.

2. The network device of claim 1, further comprising:
    a second processor unit or upgrade logic circuit configured to:
    write a first set of bus-interconnect transactions to a bus-interconnect of the network device based on a first set of data-plane transaction messages received from the virtualized standby switch over the network interface, wherein the first set of bus-interconnect transactions updates a portion of the plurality of data-plane-associated tables of the network device; and
    read a second set of bus-interconnect transactions from the bus interconnect and transmit the second set of bus-interconnect transactions as a second set of data-plane transaction messages to the virtualized standby switch over the network interface, wherein the virtualized standby switch is configured to write a second set of bus-interconnect transactions to the bus interconnect or to a host processor of the virtualized standby switch based on the second set of data-plane transaction messages to update control plane states maintained by the virtualized standby switch.

3. The network device of claim 1, wherein the computer readable instruction, when executed by the host processor, cause the host processor to establish a tunnel connection or a direct connection with the virtualized standby switch.

4. The network device of claim 1, wherein the computer readable instructions to synchronize the control-plane states of the virtualized standby switch with the control-plane states of the network device comprises instructions for switchover operations with a physical switch.

5. The network device of claim 1, wherein the control-plane associated message comprises protocol state machine updates.

6. The network device of claim 1, wherein the network device comprises a non-redundant stackable switch.

7. The network device of claim 2, wherein the network interface and the second processor unit or upgrade logic circuit is a part of a plug-able module that is connected to a bus-interconnect of the network device.

8. The network device of claim 1 wherein the synchronization operation is performed using at least one of high availability (HA) operations, In-Service Software Upgrade (ISSU) operations, and Stateful Switchover (SSO) operations.

9. The network device of claim 1, wherein the virtualized standby switch is configured to synchronize with the control-plane states of the network device over a finite period.

10. The network device of claim 1, wherein the network device directs the remote computing device to instantiate the virtualized standby switch by directing the remote computing device to retrieve a system image of the network device from an image server.

11. The network device of claim 1, wherein the update of the one or more of the plurality of data-plane-associated tables and states of the network device includes at least one of:
    updates associated with newly learnt MAC entries;
    updates associated with Layer 3 entries;
    updates associated with EtherChannel membership;
    updates associated with Spanning Tree Protocol topology-change;
    updates associated with protocol state or resource state change; and
    updates associated with hardware resource transition change.

12. The network device of claim 1, wherein the network connection comprises a front-side interchassis system link of the switch.

13. The network device of claim 1, wherein the network connection comprises a back-side interchassis system link of the switch that connects to a communication link across an adapter.

14. The network device of claim 1, wherein the computer readable instructions includes instructions to synchronize the control-plane states of the network device with the control-plane states of the virtualized standby switch after the host processor boot-ups with the new system image.

15. A method to upgrade a non-redundant stackable switch comprising a host processor executing a system image, the method comprising:
    establishing, via a network interface of the stackable switch, a network connection with a remote computing device comprising a remote processor;
    directing the remote computing device to instantiate a virtualized standby switch, wherein the instantiated virtualized standby switch is configured to execute a set of instructions to manage and maintain the plurality of data-plane-associated tables of the switch-fabric of the network device;

synchronizing, over a switchover operation, control-plane states of the virtualized standby switch with control-plane states of the network device; and resetting the host processor to boot-up with a new system image in an upgrade or boot-up process, wherein during the upgrade process, the virtualized standby switch is configured to update, via data-plane transaction messages over the network interface, one or more of the plurality of data-plane-associated tables, and states of the network device, wherein the virtualized standby switch provides near-hitless operation of the network switch while the host processor is unavailable during the upgrade or boot-up process.

16. The method of claim 15, further comprising:

receiving, over the network interface, a first set of data-plane transaction messages from the virtualized standby switch;

writing a first set of bus-interconnect transactions to a bus-interconnect of the stackable switch based on the received first set of data-plane transaction messages, wherein the first set of bus-interconnect transactions updates a portion of the plurality of data-plane-associated tables of the network device;

reading, from the bus interconnect, a second set of bus-interconnect transactions from the data-plane of the stackable switch; and transmitting, to the virtualized standby switch, over the network interface, a second set of data-plane transaction messages generated based on the second set of bus-interconnect transactions, wherein the virtualized standby switch is configured to write a second set of bus-interconnect transactions to the bus interconnect of the virtualized standby switch based on the second set of data-plane transaction messages to update control plane states maintained by the virtualized standby switch.

17. The method of claim 15, wherein the update of the one or more of the plurality of data-plane-associated tables and states of the network device includes at least one of:

updates associated with newly learnt MAC entries;
updates associated with Layer 3 entries;
updates associated with EtherChannel membership;
updates associated with Spanning Tree Protocol topology-change;
updates associated with protocol state or resource state change; and
updates associated with hardware resource transition change.

18. A non-transitory computer readable medium comprising computer readable instructions, wherein execution of the computer readable instruction by a processor of a network device, cause the processor to:

establish, via a network interface of the network device, a network connection with a remote computing device comprising a remote processor;

direct the remote computing device to instantiate a virtualized standby switch, wherein the instantiated virtualized standby switch is configured to execute a set of instructions to manage and maintain the plurality of data-plane-associated tables of the switch-fabric of the network device;

synchronize control-plane states of the virtualized standby switch with control-plane states of the network device; and reset the host processor to boot-up with a new system image in an upgrade or boot-up process, wherein during the upgrade process, the virtualized standby switch is configured to update, via data-plane transaction messages over the network interface, one or more of the plurality of data-plane-associated tables, and states of the network device, wherein the virtualized standby switch provides near-hitless operation of the network switch while the host processor is unavailable during the upgrade or boot-up process.

19. The non-transitory computer readable medium of claim 18, wherein the computer readable instructions, when executed by the processor, further cause the processor to:

receive, over the network interface, a first set of data-plane transaction messages from the virtualized standby switch;

write a first set of bus-interconnect transactions to a bus-interconnect of a stackable switch based on the received first set of data-plane transaction messages, wherein the first set of bus-interconnect transactions updates a portion of the plurality of data-plane-associated tables of the network device;

read, from the bus interconnect, a second set of bus-interconnect transactions from the data plane; and transmitting, to the virtualized standby switch, over the network interface, a second set of data-plane transaction messages generated based on the second set of bus-interconnect transactions, wherein the virtualized standby switch is configured to write a second set of bus-interconnect transactions to the bus interconnect or a host processor of the virtualized standby switch based on the second set of data-plane transaction messages to update control plane states maintained by the virtualized standby switch.

\* \* \* \* \*